US012601318B2

(12) United States Patent
Horikoshi et al.

(10) Patent No.: US 12,601,318 B2
(45) Date of Patent: Apr. 14, 2026

(54) FUEL REFORMING SYSTEM FOR VEHICLE WITH ENGINE MOUNTED THEREON

(71) Applicant: Mazda Motor Corporation, Hiroshima (JP)

(72) Inventors: Masahiro Horikoshi, Aki-gun (JP); Yuji Harada, Aki-gun (JP); Kenji Uchida, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 19/045,614

(22) Filed: Feb. 5, 2025

(65) Prior Publication Data

US 2025/0264079 A1 Aug. 21, 2025

(30) Foreign Application Priority Data

Feb. 15, 2024 (JP) ................................ 2024-021533

(51) Int. Cl.
*F02M 37/00* (2006.01)
*F02M 27/02* (2006.01)

(52) U.S. Cl.
CPC ........ *F02M 37/0023* (2013.01); *F02M 27/02* (2013.01); *F02M 37/007* (2013.01)

(58) Field of Classification Search
CPC .. F02M 37/0023; F02M 27/02; F02M 37/007; F02M 25/12; C01B 3/26; F02D 13/0276; F02D 19/0644; F02D 19/0671
See application file for complete search history.

(56) References Cited

U.S. PATENT DOCUMENTS

2023/0349334 A1* 11/2023 Heaton ............... F02D 19/0644
2023/0406701 A1 12/2023 Kiyosawa et al.
2025/0264075 A1* 8/2025 Sakima ..................... C01B 3/26
2025/0264076 A1* 8/2025 Horikoshi ........... F02D 13/0276

FOREIGN PATENT DOCUMENTS

JP 2022-104521 A 7/2022

* cited by examiner

*Primary Examiner* — Sizo B Vilakazi
(74) *Attorney, Agent, or Firm* — XSENSUS LLP

(57) ABSTRACT

A fuel reforming system includes a reciprocating engine; a decomposer that decomposes a hydrocarbon fuel; and a hydrocarbon fuel supply device. The reciprocating engine includes an intake port, an exhaust port, and a third port that allows a cylinder and the decomposer to communicate and that is opened and closed by an on-off valve. The on-off valve opens in a stroke in which a combustion gas inside the cylinder is supplied to the decomposer with ascending of a piston. The on-off valve opens in a stroke in which a combustion gas, in which the carbon and the hydrogen gas has been removed, is introduced from the third port to the cylinder with descending of the piston. The hydrocarbon fuel supply device injects the hydrocarbon fuel into the third port between the on-off valve and the decomposer during a stroke in which the on-off valve is closed.

8 Claims, 12 Drawing Sheets

FUEL REFORMING SYSTEM FOR VEHICLE WITH ENGINE MOUNTED THEREON

CROSS-REFERENCE TO RELATED APPLICATION

The present application claims priority to Japanese Application No. 2024-021533, filed in Japan on Feb. 15, 2024, the entire contents of which is incorporated by reference.

TECHNICAL FIELD

A technique disclosed herein relates to a fuel reforming system for a vehicle with an engine mounted thereon.

BACKGROUND

Patent Literature 1 describes a device that directly decomposes hydrocarbon into carbon and hydrogen. This conventional decomposition apparatus includes a reactor in which a catalyst is accommodated. When a raw material gas containing hydrocarbon is supplied to the reactor, carbon produced by a catalytic reaction adheres to the catalyst. A reactant gas containing hydrogen passes through the reactor. A hydrogen refining device downstream of the reactor refines the hydrogen in the reactant gas to increase the hydrogen concentration.

CITATION LIST

Patent Literature

[Patent Literature 1] Japanese Patent Laid-Open No. 2022-104521

SUMMARY

Problems to be Solved

In the technical field of a vehicle (for example, a four-wheel automobile), an approach for carbon neutrality has been sought. To realize carbon neutrality in a vehicle on which an engine using a hydrocarbon fuel (including gasoline and/or light oil) is mounted, a new technique of recovering carbon (C) or $CO_2$ from the hydrocarbon fuel as well as improving the thermal efficiency and/or the exhaust emission performance of the engine is required.

In the vehicle on which the engine using the hydrocarbon fuel is mounted, when carbon or $CO_2$ is intended to be recovered, (1) recovery of $CO_2$ after combustion of the hydrocarbon fuel or (2) recovery of carbon by decomposing the hydrocarbon fuel into carbon and a hydrogen gas prior to combustion of the hydrocarbon fuel is conceived. Considering that the recovered $CO_2$ or carbon is stored in the vehicle, since $CO_2$ is heavier than carbon, (2) is more advantageous in terms of the fuel efficiency of the vehicle. Further, in (2), it is also possible to use the hydrogen gas as fuel for the engine. There is also an advantage in that combustion of the hydrogen gas generates no oxide of carbon resulted from the combustion.

Thus, mounting the aforementioned conventional decomposition apparatus on a vehicle can be conceived. The conventional decomposition apparatus includes a heating device for increasing the temperature of a catalyst. When the conventional decomposition apparatus is mounted on a vehicle, it is possible to utilize the heat of the engine for increasing the temperature of the catalyst.

However, when a hydrogen gas is intended to be used for an engine fuel, a high-concentration hydrogen gas is required. The conventional decomposition apparatus requires a hydrogen refining device using a PSA (Pressure Swing Adsorption) method for refining hydrogen from a reactant gas containing the hydrogen to obtain the high-concentration hydrogen gas. Mounting of the hydrogen refining device on a vehicle has a disadvantage in that the vehicle weight increases. The conventional decomposition apparatus is unsuitable for being mounted on a vehicle.

A technique disclosed herein provides a fuel reforming system suitable for being mounted on a vehicle.

Means for Solving the Problems

Use of a membrane reactor that concurrently performs decomposition of a hydrocarbon fuel and separation of a hydrogen gas for a fuel reforming system for a vehicle may be conceived. The membrane reactor, which is even compact, can produce a high-concentration hydrogen gas such that while a hydrocarbon fuel is decomposed into carbon and a hydrogen gas using a catalyst, a separation membrane allows only the hydrogen gas to permeate therethrough. However, for efficient production of the high-concentration hydrogen gas in the membrane reactor, the pressure of a raw material gas containing the hydrocarbon fuel to be supplied to the membrane reactor needs to be increased.

The present inventors have focused on a gas inside a cylinder being compressed with ascending of a piston in a reciprocating engine. That is, the fuel reforming system disclosed herein decomposes a hydrocarbon fuel utilizing heat of a combustion gas generated in the reciprocating engine and a pressure when the combustion gas is compressed in accordance with the ascending of the piston. A decomposition process of the hydrocarbon fuel in the fuel reforming system mounted on a vehicle is combined with operation of the reciprocating engine.

However, when a hydrocarbon fuel is decomposed using piston strokes of the reciprocating engine, a vaporization time of the hydrocarbon fuel and/or a decomposition time of the hydrocarbon fuel could not be secured sufficiently long. When a reaction available time in which vaporization and/or a decomposition reaction is available cannot be secured long, yields of carbon and a hydrogen gas in the fuel reforming system are reduced. This is because when the reaction available time is short, the carbon and the hydrogen gas obtained from the injected hydrocarbon fuel are reduced. Note that the "reaction available time" of the hydrocarbon fuel refers to the time from injection of the hydrocarbon fuel by a hydrocarbon fuel supply device through vaporization of the hydrocarbon fuel to decomposition of the hydrocarbon fuel into the carbon and the hydrogen gas by the decomposer, during which the reaction is available. The reaction available time is mainly determined by the operating conditions of the reciprocating engine. For example, when the rotational speed of the reciprocating engine is high, the reaction available time is reduced.

The technique disclosed herein increases yields of carbon and a hydrogen gas in a fuel reforming system mounted on a vehicle.

Specifically, the technique disclosed herein relates to a fuel reforming system for a vehicle with an engine mounted thereon. The fuel reforming system includes: a reciprocating engine that is mounted on a vehicle and in which a piston in a cylinder reciprocates; a decomposer that decomposes a hydrocarbon fuel into carbon and a hydrogen gas; and a hydrocarbon fuel supply device that supplies the hydrocarbon fuel to the decomposer, in which the reciprocating engine includes an intake port, an exhaust port, and a third port that allows the cylinder and the decomposer to communicate with each other and that is opened and closed by an on-off valve, the on-off valve opens in a stroke in which a combustion gas inside the cylinder is supplied to the decomposer with ascending of the piston and in a stroke in which a combustion gas with the carbon and the hydrogen gas removed is introduced from the third port to the cylinder with descending of the piston, and the hydrocarbon fuel supply device injects the hydrocarbon fuel into the third port between the on-off valve and the decomposer during a stroke in which the on-off valve is closed.

The fuel reforming system includes the decomposer and the hydrocarbon fuel supply device.

The hydrocarbon fuel supply device supplies a hydrocarbon fuel to the decomposer. A fuel tank mounted on a vehicle may store the hydrocarbon fuel. The hydrocarbon fuel supply device supplies the hydrocarbon fuel in the fuel tank to the decomposer.

The decomposer communicates with the cylinder via the third port. The on-off valve opens in the stroke in which the combustion gas inside the cylinder is supplied to the decomposer with ascending of the piston. The combustion gas inside the cylinder pushed by the piston is supplied to the decomposer through the third port. The decomposer decomposes the hydrocarbon fuel supplied from the hydrocarbon fuel supply device, utilizing heat of the combustion gas supplied from the cylinder and a pressure of the combustion gas in accordance with ascending of the piston. Note that the decomposer may store carbon. The hydrogen gas may be used as fuel for the reciprocating engine.

The on-off valve also opens in the stroke in which the combustion gas with the carbon and the hydrogen gas removed is introduced from the third port to the cylinder with descending of the piston.

The hydrocarbon fuel supply device injects the hydrocarbon fuel into the third port between the on-off valve and the decomposer during the stroke in which the on-off valve is closed. The hydrocarbon fuel injected into the third port vaporizes inside the third port. The vaporized hydrocarbon fuel is delivered to the decomposer by means of the combustion gas flowing from the cylinder to the decomposer at timing of the on-off valve being opened and the piston ascending. Then, after the piston descends and the on-off valve is closed, the hydrocarbon fuel remains in the decomposer until the on-off valve opens next. Since the hydrocarbon fuel remains in the decomposer for a relatively long period of time, a sufficiently long reaction available time of the hydrocarbon fuel can be secured. The yields of the carbon and the hydrogen gas in the fuel reforming system are increased.

Another fuel reforming system disclosed herein includes: a reciprocating engine that is mounted on a vehicle and in which a piston in a cylinder reciprocates; a decomposer that decomposes a hydrocarbon fuel into carbon and a hydrogen gas; and a hydrocarbon fuel supply device that supplies the hydrocarbon fuel to the decomposer, in which the reciprocating engine includes an intake port, an exhaust port, and a third port that allows the cylinder and the decomposer to communicate with each other and that is opened and closed by an on-off valve, the on-off valve opens in a stroke in which a combustion gas inside the cylinder is supplied to the decomposer with ascending of the piston and in a stroke in which a combustion gas with the carbon and the hydrogen gas removed is introduced from the third port to the cylinder with descending of the piston, the decomposer includes a catalyst portion that decomposes the hydrocarbon fuel using a catalyst and a space that is on a side opposite to the third port across the catalyst portion, the space being connected to the catalyst portion, and the hydrocarbon fuel supply device injects the hydrocarbon fuel into the space during a stroke in which the on-off valve is opened and the piston is ascending.

In this fuel reforming system, the hydrocarbon fuel supply device injects the hydrocarbon fuel during the stroke in which the on-off valve is opened and the piston is ascending. The hydrocarbon fuel supply device injects the hydrocarbon fuel into the space that is on a side opposite to a side of the third port across the catalyst portion. The injected hydrocarbon fuel is delivered from the space to the catalyst portion by means of the flow of the combustion gas returning from the decomposer toward the cylinder at timing of the piston descending. Then, after the on-off valve is closed, the hydrocarbon fuel remains in the catalyst portion until the on-off valve opens next. Since the hydrocarbon fuel remains in the catalyst portion for a relatively long period of time, a sufficiently long reaction available time of the hydrocarbon fuel can be secured. The yields of the carbon and the hydrogen gas in the fuel reforming system are increased.

The hydrocarbon fuel supply device may inject the hydrocarbon fuel into the third port immediately after closing of the opened on-off valve.

When the hydrocarbon fuel is injected into the third port immediately after the on-off valve is closed, the time from the injection of the hydrocarbon fuel to the delivery of the hydrocarbon fuel to the decomposer in accordance with opening of the on-off valve can be used for vaporization of the hydrocarbon fuel. There is an advantage in improving the yields of the carbon and the hydrogen gas in the fuel reforming system.

The hydrocarbon fuel supply device may inject the hydrocarbon fuel into the space in a latter part of a stroke in which the piston is ascending.

In the latter part of the stroke in which the piston is ascending, a pressure and a temperature inside the third port including the decomposer increase. Since the hydrocarbon fuel is injected into the space under an environment with the high pressure and temperature, there is an advantage in the vaporization of the hydrocarbon fuel. Since the vaporized hydrocarbon fuel can be decomposed into the carbon and the hydrogen gas for a short period of time, the yields of the carbon and the hydrogen gas in the fuel reforming system are improved.

The reciprocating engine may perform a six-stroke cycle, the six-stroke cycle including: an intake stroke in which at least intake air is introduced into the cylinder through the intake port with descending of the piston; a compression stroke in which an air-fuel mixture containing the hydrogen gas supplied into the cylinder is compressed with ascending of the piston; an expansion stroke in which the piston descends with combustion of the air-fuel mixture; a re-compression stroke in which a combustion gas is compressed with ascending of the piston; a re-expansion stroke in which the piston descends; and an exhaust stroke in which an exhaust gas is discharged through the exhaust port with ascending of the piston, and the on-off valve may open in the re-compression stroke and the re-expansion stroke and may close in the intake stroke, the compression stroke, the expansion stroke, and the exhaust stroke.

The reciprocating engine performs the six-stroke cycle. In the six-stroke cycle, the re-compression stroke in which the combustion gas is compressed with ascending of the piston and the re-expansion stroke in which the piston descends are added to the cycle of the typical four-stroke cycle including the intake stroke, the compression stroke, the expansion stroke, and the exhaust stroke, between the expansion stroke and the exhaust stroke.

The on-off valve opens in the re-compression stroke and the re-expansion stroke. The fuel reforming system can decompose the hydrocarbon fuel utilizing the heat and the pressure of the combustion gas in the re-compression stroke. The on-off valve is closed between the exhaust stroke subsequent to the re-expansion stroke and the expansion stroke.

When performing injection into the third port between the on-off valve and the decomposer, the hydrocarbon fuel supply device injects the hydrocarbon fuel between the exhaust stroke and the expansion stroke. In order for the reaction available time of the hydrocarbon fuel to be as long as possible, the hydrocarbon fuel supply device may inject the hydrocarbon fuel into the third port during the exhaust stroke.

When performing injection into the space on the side opposite to the third port across the catalyst portion, the hydrocarbon fuel supply device injects the hydrocarbon fuel in the re-compression stroke. The hydrocarbon fuel supply device may inject the hydrocarbon fuel into the space in the latter part of the re-compression stroke so that the hydrocarbon fuel is injected under the environment with the high pressure and temperature in the decomposer and the third port.

The reciprocating engine may perform an irregular four-stroke cycle, the irregular four-stroke cycle including: a compression stroke in which an air-fuel mixture containing the hydrogen gas supplied into the cylinder is compressed with ascending of the piston; an expansion stroke in which the piston descends with combustion of the air-fuel mixture; a re-compression stroke in which a combustion gas is compressed with ascending of the piston; and a scavenging stroke in which an exhaust gas inside the cylinder is discharged through the exhaust port and at least intake air is introduced into the cylinder through the intake port with descending of the piston, and the on-off valve may open in the re-compression stroke and the scavenging stroke and may close in the compression stroke and the expansion stroke.

The reciprocating engine performs the irregular four-stroke cycle. In the irregular four-stroke cycle, in place of the exhaust stroke and the intake stroke of the typical four-stroke cycle including the intake stroke, the compression stroke, the expansion stroke, and the exhaust stroke, the re-compression stroke in which the combustion gas is compressed with ascending of the piston is performed after the expansion stroke, and the scavenging stroke in which the exhaust and intake are simultaneously performed is performed at the time of the piston descending after the re-compression stroke.

The on-off valve opens in the re-compression stroke subsequent to the expansion stroke and the scavenging stroke, and closes in the compression stroke and the expansion stroke. The fuel reforming system can decompose the hydrocarbon fuel utilizing the heat and the pressure of the combustion gas in the re-compression stroke.

When performing injection into the third port between the on-off valve and the decomposer, the hydrocarbon fuel supply device injects the hydrocarbon fuel between the compression stroke and the expansion stroke. In order for the reaction available time of the hydrocarbon fuel to be as long as possible, the hydrocarbon fuel supply device may inject the hydrocarbon fuel into the third port during the compression stroke.

When performing injection into the space on the side opposite to the third port across the catalyst portion, the hydrocarbon fuel supply device injects the hydrocarbon fuel in the re-compression stroke. The hydrocarbon fuel supply device may inject the hydrocarbon fuel into the third port in the latter part of the re-compression stroke so that the hydrocarbon fuel is injected under the environment with the high pressure and temperature in the decomposer and the third port.

Advantageous Effects

The fuel reforming system for a vehicle with an engine mounted thereon is suitable for being mounted on a vehicle and can increase yields of carbon and a hydrogen gas.

DETAILED DESCRIPTION

Hereinafter, an embodiment of a fuel reforming system for a vehicle with an engine mounted thereon will be described with reference to the drawings. The system described herein is an example.

(Configuration of Fuel Reforming System)

Figure 1:
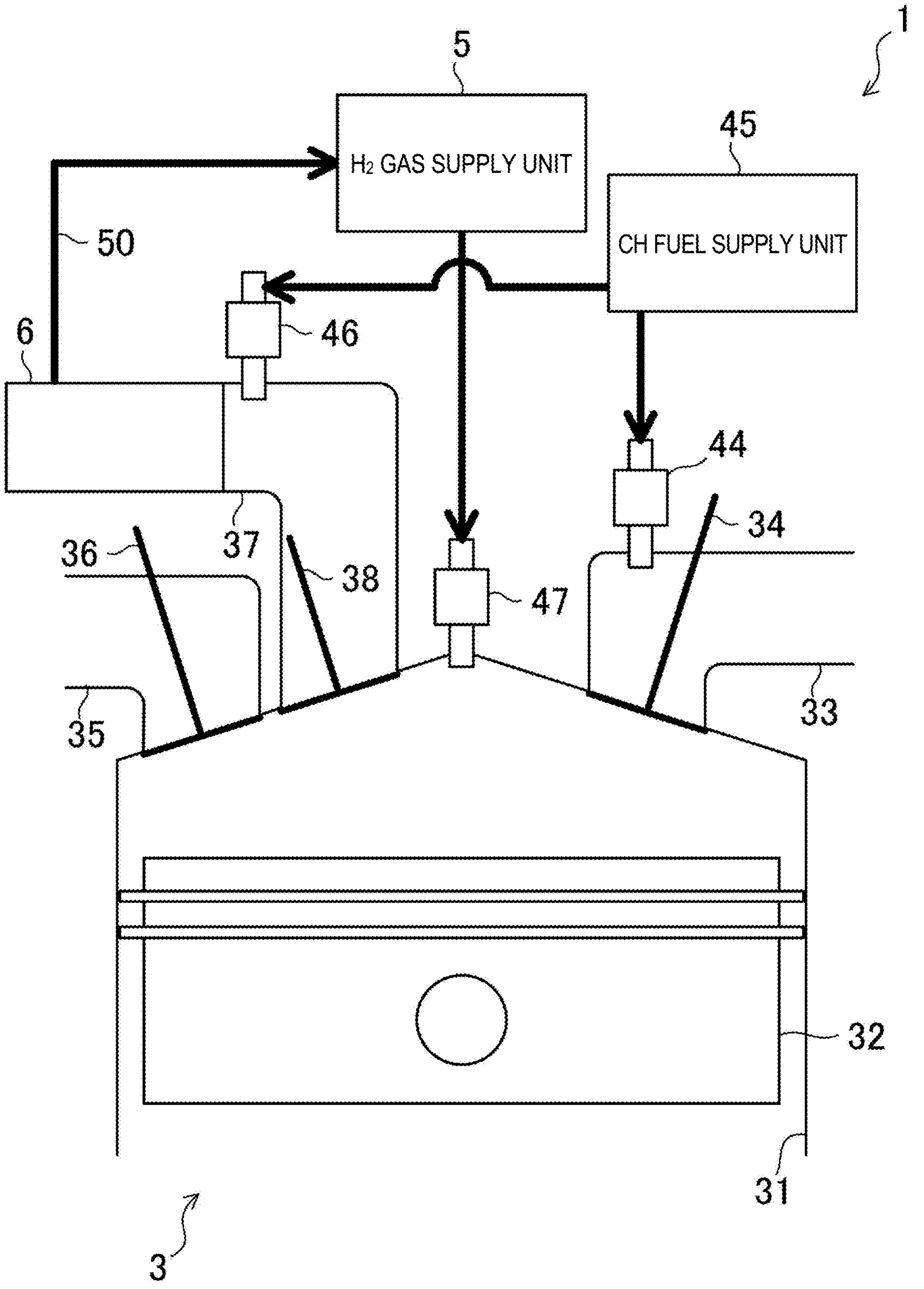
FIG. 1 shows a fuel reforming system mounted on a vehicle.

FIG. 1 shows a fuel reforming system 1 mounted on a vehicle. A fuel tank mounted on the vehicle stores a hydrocarbon fuel. The hydrocarbon fuel is, for example, gasoline. The hydrocarbon fuel is not limited to gasoline. The fuel reforming system 1 decomposes the hydrocarbon fuel into carbon and a hydrogen gas. The carbon is stored in a decomposer 6 described later. The hydrogen gas is used as fuel for a reciprocating engine 3. The fuel reforming system 1 realizes carbon neutrality of the vehicle on which the hydrocarbon fuel is mounted.

The fuel reforming system 1 includes the reciprocating engine 3. The reciprocating engine 3 includes a cylinder 31 and a piston 32 that reciprocates inside the cylinder 31. The reciprocating engine 3 includes a plurality of cylinders 31. The plurality of cylinders 31 are arranged, for example, in a direction in which a crankshaft of the reciprocating engine 3 extends. The piston 32 of each cylinder 31 is connected to the crankshaft via a connecting rod. The connecting rod converts the reciprocating movement of the piston 32 into the rotation of the crankshaft. The crankshaft is connected to driving wheels via a transmission. The reciprocating engine

3 outputs drive power for traveling the vehicle. Note that the reciprocating engine 3 may be used as a drive source for driving a power generator.

The reciprocating engine 3 includes an intake port 33. The intake port 33 communicates with the cylinder 31. Each cylinder 31 includes one or a plurality of intake ports 33. Each cylinder 31 may include, for example, two intake ports 33. The intake port 33 is connected to an intake pipe. As will be described later, intake air is introduced into the cylinder 31 through the intake port 33. The intake air contains at least fresh air. The intake air may contain an EGR (Exhaust Gas Recirculation) gas.

The reciprocating engine 3 includes an intake valve 34. The intake valve 34 is a poppet valve that opens and closes the intake port 33. When the intake valve 34 opens, the intake air is introduced into the cylinder 31. An intake valve operating device 41 shown in FIG. 3 opens and closes the intake valve 34. The intake valve operating device 41 includes, for example, an intake camshaft mechanically connected to the intake valve 34. The intake valve operating device 41 can continuously change the valve timing of the intake valve 34 (so-called S-VT (Sequential-Valve Timing)). The intake valve operating device 41 can also continuously change the valve lift of the intake valve 34 (so-called CVVL (Continuously Variable Valve Lift)). The intake valve operating device 41 may adopt a publicly-known hydraulic or electric mechanism. The intake valve operating device 41 changes the valve timing and/or the valve lift in accordance with the operating conditions of the reciprocating engine 3.

The reciprocating engine 3 includes an exhaust port 35. The exhaust port 35 communicates with the cylinder 31. Each cylinder 31 includes one or a plurality of exhaust ports 35. Each cylinder 31 may include, for example, one exhaust port 35. The exhaust port 35 is connected to an exhaust pipe. As will be described later, an exhaust gas is discharged from the inside of the cylinder 31 through the exhaust port 35.

The reciprocating engine 3 includes an exhaust valve 36. The exhaust valve 36 is a poppet valve that opens and closes the exhaust port 35. When the exhaust valve 36 opens, an exhaust gas is discharged to the outside of the cylinder 31. An exhaust valve operating device 42 shown in FIG. 3 opens and closes the exhaust valve 36. The exhaust valve operating device 42 includes, for example, an exhaust camshaft mechanically connected to the exhaust valve 36. The exhaust valve operating device 42 can continuously change the valve timing of the exhaust valve 36 (so-called S-VT). The exhaust valve operating device 42 can also continuously change the valve lift of the exhaust valve 36 (so-called CVVL). The exhaust valve operating device 42 may adopt a publicly-known hydraulic or electric mechanism. The exhaust valve operating device 42 changes the valve timing and/or the valve lift in accordance with the operating conditions of the reciprocating engine 3.

The reciprocating engine 3 includes a third port 37. The third port 37 communicates with the cylinder 31. Each cylinder 31 includes at least one third port 37. Each cylinder 31 may include, for example, one third port 37.

A typical reciprocating engine includes two intake ports and two exhaust ports for one cylinder. One of the two exhaust ports may be repurposed for the third port 37. The reciprocating engine 3 of FIG. 1 includes two intake ports 33, one exhaust port 35, and one third port 37 for one cylinder 31. Note that for easier understanding, FIG. 1 illustrates the exhaust port 35 and the third port 37 at positions shifted from each other.

Note that one of the two intake ports may be repurposed for the third port 37. However, the two intake ports 33 are advantageous in that a lot of fresh air can be introduced into the cylinder 31. When the exhaust port or the intake port is repurposed for the third port 37, the typical reciprocating engine can be reused for the reciprocating engine 3 of the fuel reforming system 1. Note that the reciprocating engine 3 may include two intake ports 33, two exhaust ports 35, and one third port 37 for one cylinder 31.

The reciprocating engine 3 includes an on-off valve 38. The on-off valve 38 is a poppet valve that opens and closes the third port 37. A third valve operating device 43 shown in FIG. 3 opens and closes the on-off valve 38. The third valve operating device 43 includes, for example, a third camshaft mechanically connected to the on-off valve 38. The third valve operating device 43 opens the on-off valve 38 twice during one cycle in some cases (see FIG. 6). The third valve operating device 43 can also stop opening and closing the on-off valve 38. A publicly-known hydraulic or electric mechanism may be adopted for a valve stopping mechanism to stop opening and closing the on-off valve 38. The valve stopping mechanism may be, for example, incorporated into a rocker arm interposed between the third camshaft and the on-off valve 38. The valve stopping mechanism may also be incorporated into a lash adjuster that supports the rocker arm. Note that the on-off valve 38 may be mechanically connected to the intake camshaft or the exhaust camshaft.

An intake port injector 44 is attached to the reciprocating engine 3. An injection hole of the intake port injector 44 faces the inside of the intake port 33. The intake port injector 44 injects the hydrocarbon fuel into the intake port 33. A hydrocarbon fuel supply unit 45 is connected to the intake port injector 44. The hydrocarbon fuel supply unit 45 includes a fuel tank that stores the hydrocarbon fuel and a fuel pump that pumps the hydrocarbon fuel. The hydrocarbon fuel supply unit 45 supplies the hydrocarbon fuel to the intake port injector 44.

A third port injector 46 is attached to the reciprocating engine 3. An injection hole of the third port injector 46 faces the inside of the third port 37. More specifically, in an example of FIG. 1, the third port injector 46 is positioned between the decomposer 6 and the on-off valve 38 in the third port 37. The third port injector 46 injects the hydrocarbon fuel into the third port 37. The third port injector 46 is an example of a hydrocarbon fuel supply device. The hydrocarbon fuel supply unit 45 is also connected to the third port injector 46. The hydrocarbon fuel supply unit 45 selectively supplies the hydrocarbon fuel to the intake port injector 44 and the third port injector 46.

A hydrogen injector 47 is attached to the reciprocating engine 3. An injection hole of the hydrogen injector 47 faces the inside of the cylinder 31. The hydrogen injector 47 injects the hydrogen gas into the cylinder 31.

Note that the injector that injects the hydrocarbon fuel may be attached to the reciprocating engine 3 so as to face the inside of the cylinder 31 and the hydrogen injector that injects the hydrogen gas may be attached to the reciprocating engine 3 so as to face the inside of the intake port 33.

A hydrogen gas supply unit 5 is connected to the hydrogen injector 47. The hydrogen gas supply unit 5 supplies the hydrogen gas to the hydrogen injector 47. As described above, the hydrogen gas is the hydrogen gas decomposed from the hydrocarbon fuel.

The decomposer 6 is connected to the third port 37. The decomposer 6 decomposes the hydrocarbon fuel into carbon and a hydrogen gas. The decomposer 6 is attached to each cylinder 31. The decomposer 6 may be shared in common by the plurality of cylinders 31.

Figure 2:
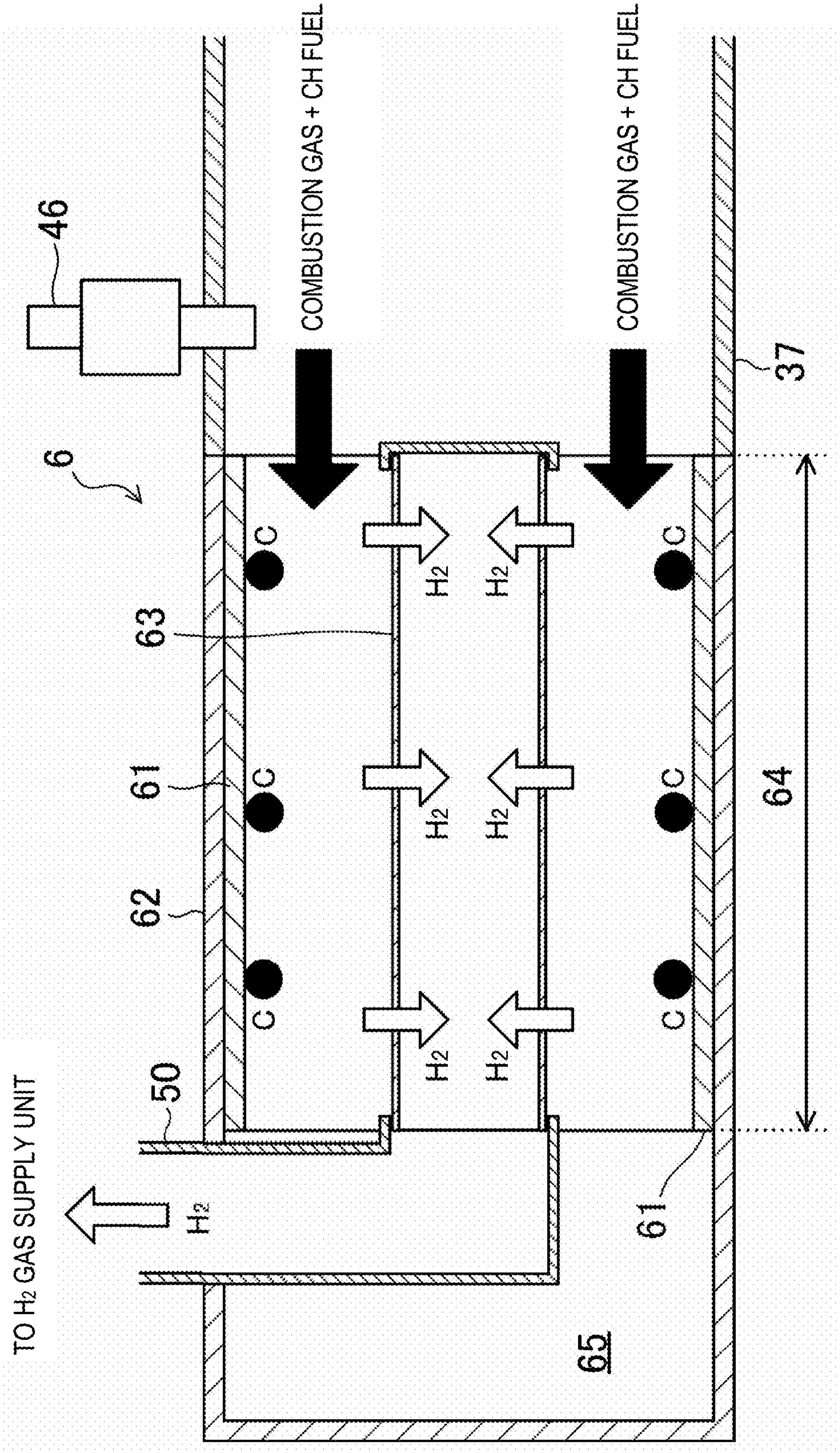
FIG. 2 shows a decomposer that decomposes a hydrocarbon fuel.

FIG. 2 shows the structure of the decomposer 6. The decomposer 6 decomposes the hydrocarbon fuel into carbon and a hydrogen gas using a catalyst, and separates the hydrogen gas using a separation membrane 63. The decomposer 6 is a so-called membrane reactor. Decomposition of the hydrocarbon fuel, for example, isooctane, is represented by the following chemical reaction formula.

$$iC_8H_{18}(g)=8C(s)+9H_2$$

Recovering carbon as a solid suppresses an increase in the vehicle weight. The fuel reforming system 1 is suitable for an on-board system.

The decomposer 6 includes a catalyst carrier 61. The catalyst that can be used for decomposition of the hydrocarbon fuel is, for example, an Ni—Al—Fe alloy. As the catalyst, various catalysts that are available for decomposition of the hydrocarbon fuel can be used.

For the carrier 61, for example, an aluminum oxide plate member can be used. The catalyst is applied on the surface of the plate member. The carrier 61 is supported on an inner surface of a case 62 of the decomposer 6. The case 62 is, for example, in a cylinder shape. Note that the shape of the carrier 61 is not limited to a particular shape. The carbon produced by decomposition of the hydrocarbon fuel adheres to the surface of the carrier 61. The decomposer 6 also stores the carbon.

The decomposer 6 includes the separation membrane 63. The separation membrane 63 is positioned on an inner side of the case 62 relative to the carrier 61. The separation membrane 63 is, for example, in a cylinder shape. The separation membrane 63 has a function of allowing only the hydrogen gas to permeate therethrough. The separation membrane 63 is, for example, a Pd alloy membrane. Note that the separation membrane 63 is not limited to the Pd alloy membrane.

The third port 37 is connected to a first end of the case 62. A second end of the case 62 is closed. A combustion gas from the cylinder 31 and the hydrocarbon fuel injected by the third port injector 46 flow into a space between the catalyst carrier 61 and the separation membrane 63 as denoted by a black arrow in FIG. 2. The catalyst decomposes the hydrocarbon fuel into carbon and a hydrogen gas. The decomposed hydrogen gas permeates through the separation membrane 63 as denoted by a white arrow in FIG. 2.

The decomposer 6 includes a catalyst portion 64 including the aforementioned catalyst carrier 61 and separation membrane 63. The catalyst portion 64 is positioned on a side of the third port 37 in the case 62, and a space 65 is formed on a side opposite to the third port 37 across the catalyst portion 64 in the case 62. As will be described later, the gas remaining inside the decomposer 6 at the start of a re-compression stroke is pushed out to the inside of the space 65 in accordance with the inflow of the combustion gas and the hydrocarbon fuel into the decomposer 6. As a result, the hydrocarbon fuel is spread over the entire catalyst portion 64 and decomposition of the hydrocarbon fuel is promoted.

A hydrogen gas passage 50 is connected to one end of a cylinder body composed of the separation membrane 63. The hydrogen gas passage 50 is connected to the hydrogen gas supply unit 5 (see FIG. 1). The hydrogen gas passage 50 guides the hydrogen gas from the decomposer 6 to the hydrogen gas supply unit 5. The hydrogen gas is delivered to the hydrogen injector 47 via the hydrogen gas supply unit 5. The hydrogen gas supply unit 5 includes, for example, a hydrogen gas tank and a hydrogen gas pump.

(Configuration of Control System)

Figure 3:
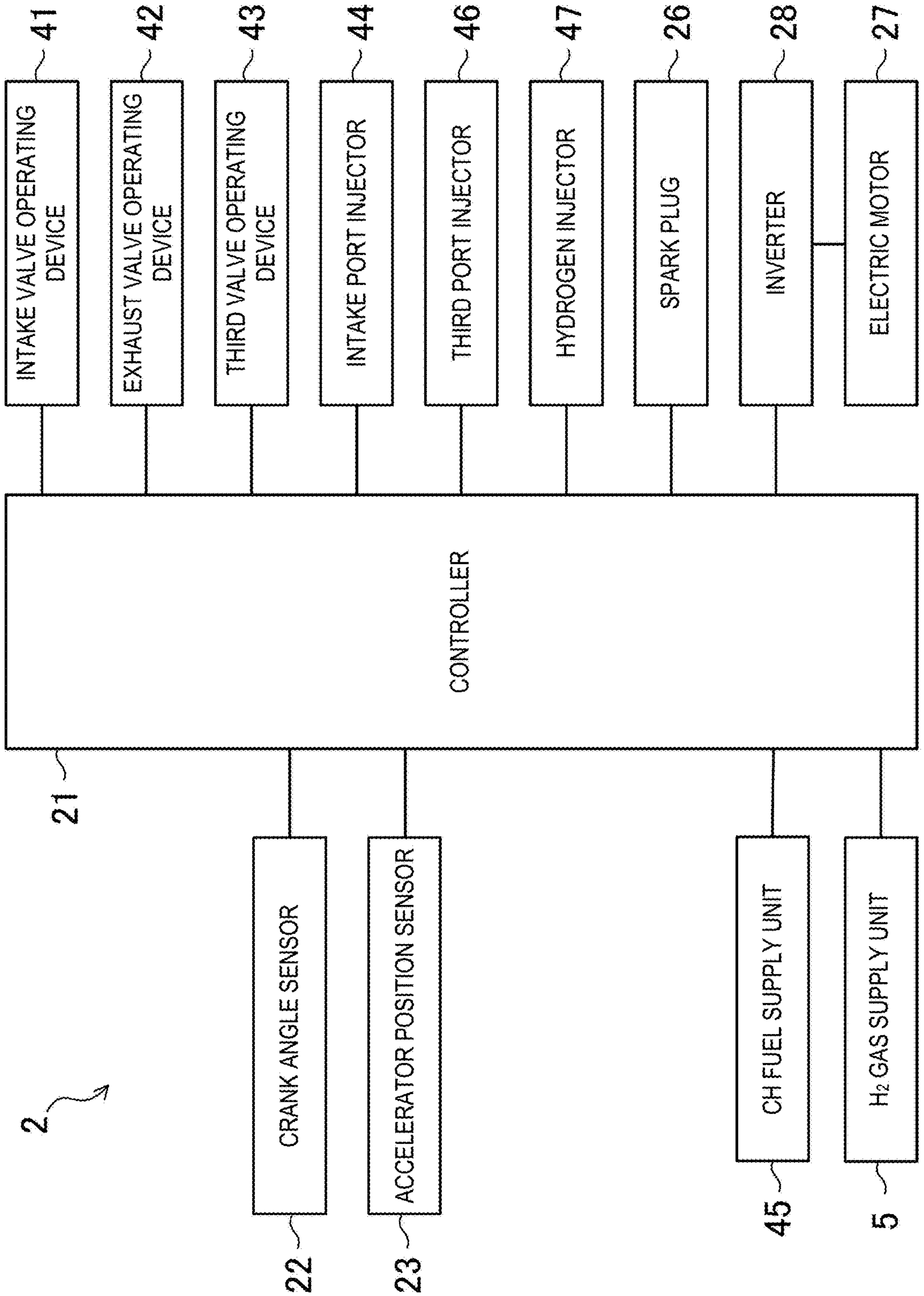
FIG. 3 shows a control system for a vehicle.

FIG. 3 is a block diagram of a control system 2 for a vehicle on which the fuel reforming system 1 is mounted. The control system 2 includes a controller 21. The controller 21 is composed of hardware such as a processor, a memory, and an interface, and software such as a database and a control program.

A crank angle sensor 22 is electrically connected to the controller 21. The crank angle sensor 22 is attached to the reciprocating engine 3. The crank angle sensor 22 outputs a measurement signal corresponding to a rotation angle of the crankshaft to the controller 21. The controller 21 can identify the rotational speed of the reciprocating engine 3 based on the measurement signal from the crank angle sensor 22.

An accelerator position sensor 23 is electrically connected to the controller 21. The accelerator position sensor 23 is attached to an accelerator pedal. The accelerator position sensor 23 outputs a signal corresponding to a depression amount of the accelerator pedal to the controller 21. The controller 21 can identify a required load of the reciprocating engine 3 based on the measurement signal from the accelerator position sensor 23.

The aforementioned intake valve operating device 41, exhaust valve operating device 42, and third valve operating device 43 are each electrically connected to the controller 21. The controller 21 outputs a control signal to each of the intake valve operating device 41, the exhaust valve operating device 42, and the third valve operating device 43 in accordance with the operating conditions of the reciprocating engine 3. The intake valve operating device 41 changes the valve timing and/or the valve lift of the intake valve 34 based on the control signal from the controller 21. The exhaust valve operating device 42 changes the valve timing and/or the valve lift of the exhaust valve 36 based on the control signal from the controller 21. The third valve operating device 43 switches between opening/closing and stopping of the on-off valve 38 based on the control signal from the controller 21.

The aforementioned intake port injector 44, third port injector 46, and hydrogen injector 47 are each electrically connected to the controller 21. The controller 21 outputs a control signal to each of the intake port injector 44, the third port injector 46, and the hydrogen injector 47. The intake port injector 44 injects the hydrocarbon fuel in a predetermined amount into the intake port 33 at predetermined timing based on the control signal from the controller 21. The third port injector 46 injects the hydrocarbon fuel in a predetermined amount into the third port 37 at predetermined timing based on the control signal from the controller 21. The hydrogen injector 47 injects the hydrogen gas in a predetermined amount into the cylinder 31 based on the control signal from the controller 21.

The control system 2 includes a spark plug 26. The spark plug 26 is attached to the reciprocating engine 3 so as to face the inside of the cylinder 31. The spark plug 26 is electrically connected to the controller 21. The controller 21 outputs a control signal to the spark plug 26. The spark plug 26 ignites an air-fuel mixture inside the cylinder 31 at predetermined timing based on the control signal from the controller 21.

The control system 2 also includes an electric motor 27. The electric motor 27 is an assist motor that complements an output shortage of the reciprocating engine 3. The electric motor 27 operates by receiving power supplied from a battery through an inverter 28. The electric motor 27 and the reciprocating engine 3 may be connected in series or may be connected in parallel. A combination of the reciprocating engine 3 and the electric motor 27 can output drive power required for traveling a vehicle. The inverter 28 is electrically connected to the controller 21. The controller 21 outputs a control signal to the inverter 28. The inverter 28 operates the electric motor 27 based on the control signal from the controller 21.

The aforementioned hydrocarbon fuel supply unit 45 and hydrogen gas supply unit 5 are each electrically connected to the controller 21. The controller 21 outputs a control signal to the hydrocarbon fuel supply unit 45 or the hydrogen gas supply unit 5.

(Six-Stroke Cycle)

Figure 4:
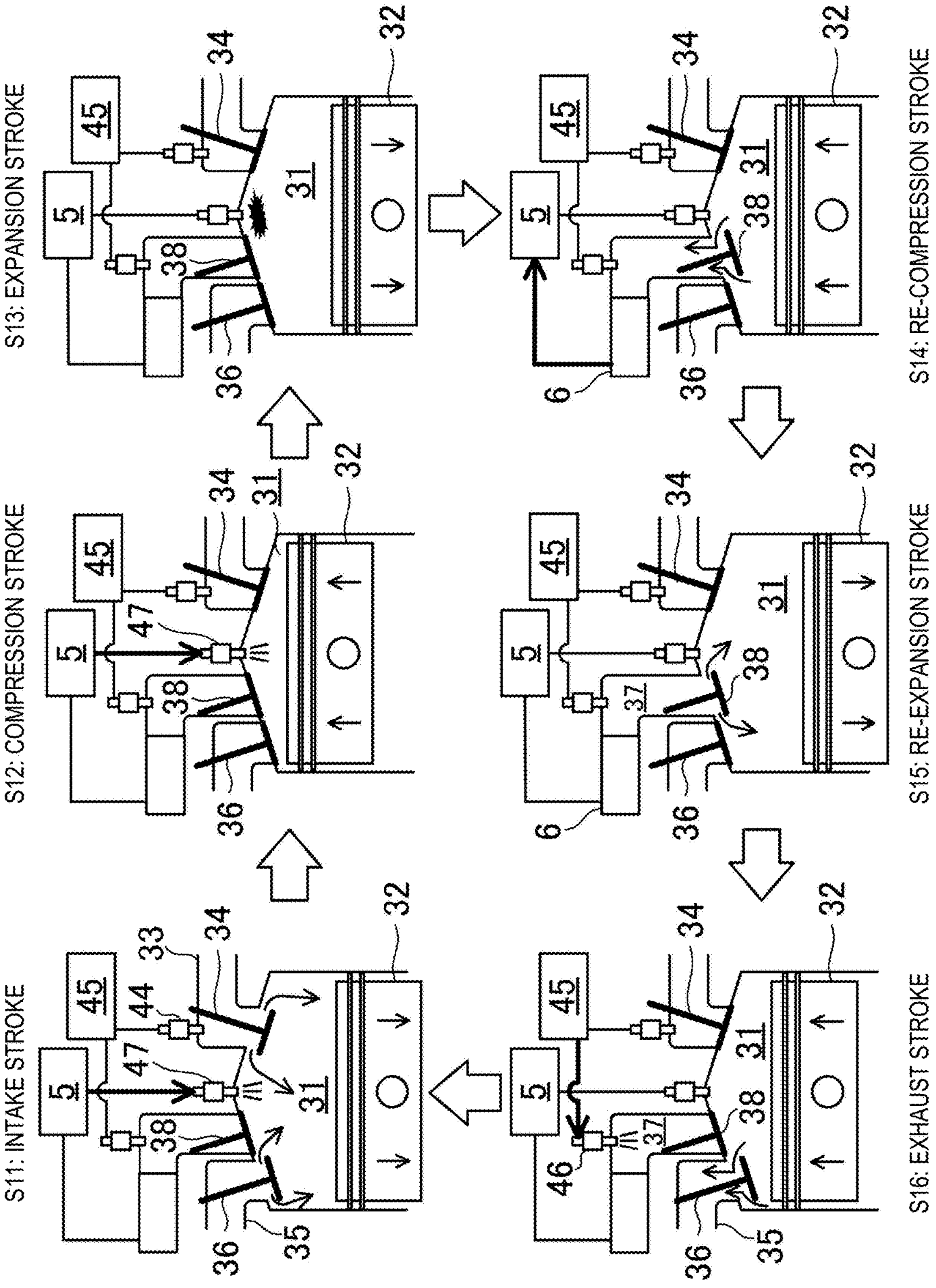
FIG. 4 shows each stroke of a six-stroke cycle.

The reciprocating engine 3 performs a six-stroke cycle so that the decomposer 6 performs decomposition of a hydrocarbon fuel. FIG. 4 shows each stroke included in the six-stroke cycle.

S11 is an intake stroke. In the intake stroke S11, the reciprocating engine 3 introduces intake air into the cylinder 31 with descending of the piston 32. In the intake stroke S11, the intake valve 34 opens. Intake air is introduced into the cylinder 31 through the intake port 33. The intake air contains at least fresh air. The intake air may contain an EGR gas. The EGR gas is a so-called external EGR gas, which is circulated into the intake pipe through an EGR passage. In the intake stroke S11, the exhaust valve 36 may open. When the exhaust valve 36 opens, an exhaust gas is introduced into the cylinder 31 through the exhaust port 35. The exhaust gas introduced into the cylinder 31 is a so-called internal EGR gas. Note that the on-off valve 38 of the third port 37 is closed.

In FIG. 4, during the intake stroke S11, the hydrogen injector 47 injects a hydrogen gas into the cylinder 31. In a compression stroke S12 subsequent to the intake stroke S11, the hydrogen injector 47 may inject the hydrogen gas. Over the period from the intake stroke S11 to the compression stroke S12, the hydrogen injector 47 may inject the hydrogen gas.

Note that when the hydrogen gas is in short supply, in the intake stroke S11, the intake port injector 44 may inject the hydrocarbon fuel to the intake port 33 so as to complement the shortage. Further, when there is no hydrogen gas, the intake port injector 44, in place of the hydrogen injector 47, may inject the hydrocarbon fuel to the intake port 33 in the intake stroke S11. When the hydrogen gas to be supplied into the cylinder 31 is in short supply, the intake port injector 44 injects the hydrocarbon fuel so that a required fuel amount of the reciprocating engine 3 is secured. The reciprocating engine 3 can operate using the hydrocarbon fuel or both the hydrocarbon fuel and the hydrogen gas.

S12 is a compression stroke. In the compression stroke S12, the reciprocating engine 3 compresses an air-fuel mixture inside the cylinder 31 with ascending of the piston 32. The intake valve 34, the exhaust valve 36, and the on-off valve 38 are all closed.

The spark plug 26 ignites the air-fuel mixture inside the cylinder 31 at timing near a compression top dead center. The air-fuel mixture starts combustion. S13 is an expansion stroke. In the expansion stroke S13, the piston 32 descends with the combustion of the air-fuel mixture. The intake valve 34, the exhaust valve 36, and the on-off valve 38 are all closed.

S14 is a re-compression stroke. In the re-compression stroke S14, the reciprocating engine 3 compresses a combustion gas inside the cylinder 31 with ascending of the piston 32. In the re-compression stroke S14, the on-off valve 38 opens. The compressed combustion gas is introduced into the decomposer 6 through the third port 37. As will be described later, the hydrocarbon fuel that the third port injector 46 injected into the third port 37 in an exhaust stroke S16, together with the combustion gas, is introduced into the decomposer 6. In the decomposer 6, the hydrocarbon fuel is decomposed into carbon and a hydrogen gas by means of the heat of the combustion gas and the catalyst. The carbon is stored in the decomposer 6. The hydrogen gas permeates through the separation membrane 63 of the decomposer 6 to be delivered to the hydrogen gas supply unit 5 by means of the pressure of the combustion gas.

Since the high pressure of the combustion gas in the re-compression stroke S14 is applied to the decomposer 6, the hydrogen gas produced in the decomposer 6 rapidly permeates through the separation membrane 63. Since the hydrogen gas on the right side of the aforementioned chemical reaction formula is discharged from the decomposer 6, the decomposition reaction of the hydrocarbon fuel in the decomposer 6 is promoted. The decomposer 6, which is even compact, utilizing the pressure in the re-compression stroke S14 of the reciprocating engine 3 can produce the hydrogen gas in an amount required for operating the reciprocating engine 3.

S15 is a re-expansion stroke. In the re-expansion stroke S15, the piston 32 descends. In the re-expansion stroke S15, the on-off valve 38 opens. When the on-off valve 38 opens, the combustion gas with the carbon and the hydrogen gas removed is introduced into the cylinder 31 through the third port 37. Opening of the on-off valve 38 in the re-expansion stroke S15 is advantageous in reducing a pumping loss of the reciprocating engine 3.

S16 is the exhaust stroke. In the exhaust stroke S16, the reciprocating engine 3 discharges the combustion gas inside the cylinder 31 through the exhaust port 35 with ascending of the piston 32. In the exhaust stroke S16, the exhaust valve 36 opens. Note that in the exhaust stroke S16, the intake valve 34 and the on-off valve 38 are closed. Although the details will be described later, in the exhaust stroke S16, the third port injector 46 injects the hydrocarbon fuel into the third port 37.

After the exhaust stroke S16, the reciprocating engine 3 returns to the intake stroke S11.

In this manner, the fuel reforming system 1 including the reciprocating engine 3 that performs the six-stroke cycle stores, in the decomposer 6, the carbon produced by the decomposition of the hydrocarbon fuel. Further, since the reciprocating engine 3 combusts the hydrogen gas produced by the decomposition of the hydrocarbon fuel, an oxide of carbon resulted from the combustion is not generated. The fuel reforming system 1 can realize carbon neutrality.

Further, the fuel reforming system 1 utilizes the heat and the pressure derived from the reciprocating engine 3, and thus, does not require a separate dedicated device for generating the heat and/or the pressure necessary for the decomposition of the hydrocarbon fuel. The fuel reforming system 1 is useful as an on-board system.

Note that when the carbon storage amount in the decomposer 6 increases, the carbon is recovered from the decomposer 6.

(Switching Between Six-Stroke Cycle and Four-Stroke Cycle)

The reciprocating engine 3 included in the fuel reforming system 1 is also an engine that outputs drive power for traveling a vehicle. The operating conditions of the reciprocating engine 3 significantly change from a low load to a high load and from a low speed to a high speed. When the rotational speed of the reciprocating engine 3 is low, since the time per cycle is relatively long, the decomposer 6 can efficiently decompose the hydrocarbon fuel into carbon and a hydrogen gas. However, when the rotational speed of the reciprocating engine 3 is high, since the time per cycle is short, it is difficult to secure the time for the decomposition reaction, in other words, the reaction available time of the hydrocarbon fuel.

Thus, the control system 2 for a vehicle switches between the six-stroke cycle that performs decomposition of the hydrocarbon fuel and the four-stroke cycle that does not perform decomposition of the hydrocarbon fuel, in accordance with the operating conditions of the rotational speed and the required load of the reciprocating engine 3.

Figure 5:
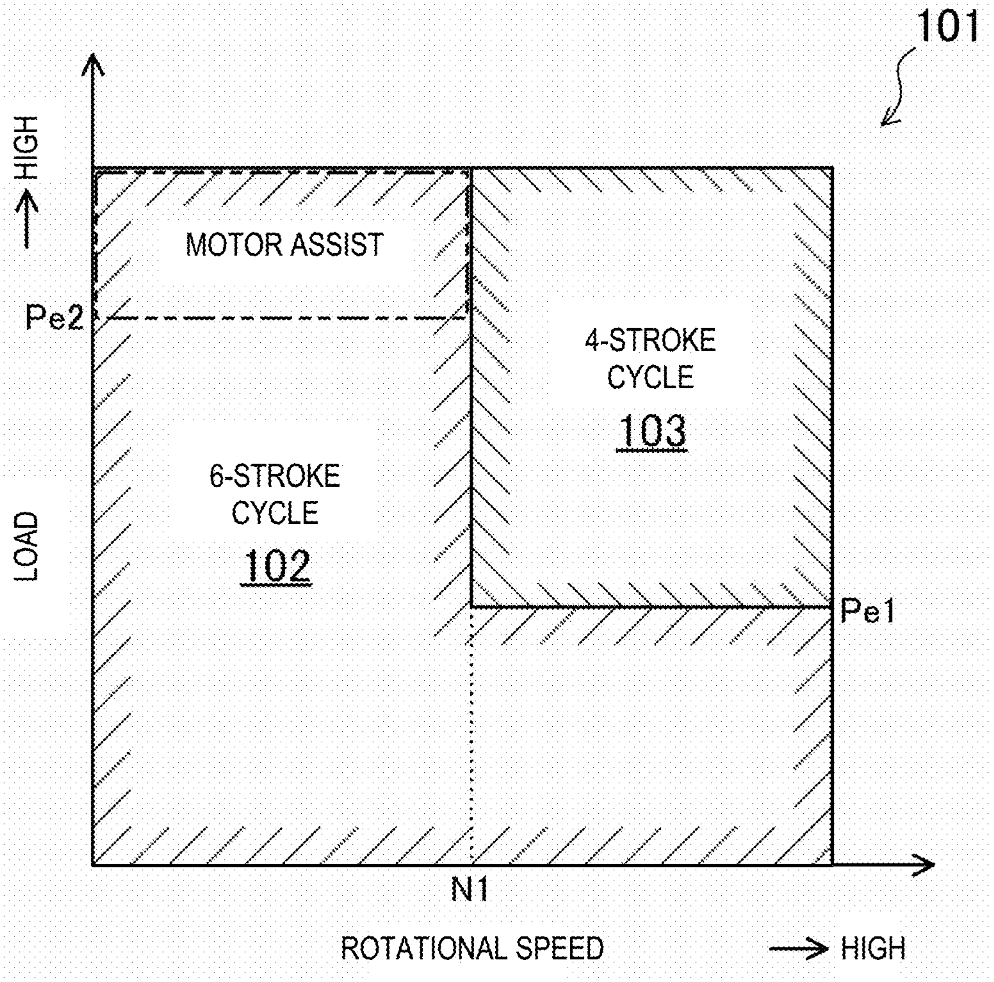
FIG. 5 shows a control map of a reciprocating engine.

FIG. 5 shows a control map 101 of the reciprocating engine 3. The control map 101 corresponds to an operating region of the reciprocating engine 3 that are defined based on the rotational speed and the required load of the engine. The controller 21 operates the reciprocating engine 3 in accordance with the control map 101.

In the control map 101, the operating region of the reciprocating engine 3 is divided into a first region 102 and a second region 103. The first region 102 is a region where the rotational speed is lower than a first rotational speed N1. The first region 102 also includes a region where the rotational speed is equal to or higher than the first rotational speed N1 and the required load is lower than a load Pe1. The second region 103 is a region where the rotational speed is equal to or higher than the first rotational speed N1 and the required load is equal to or greater than the load Pe1. The first rotational speed N1 may be a rotational speed included in a medium speed region when the operating region of the reciprocating engine 3 is trisected into a low speed region, the medium speed region, and a high speed region in a rotational speed direction. The load Pe1 may be a load included in a medium load region when the operating region of the reciprocating engine 3 is trisected into a low load region, the medium load region, and a high load region in a load direction.

The controller 21 causes the reciprocating engine 3 to perform the six-stroke cycle in the first region 102. Specifically, the controller 21 opens the on-off valve 38 at predetermined timing via the third valve operating device 43 while opening the intake valve 34 and the exhaust valve 36 at predetermined timing via the intake valve operating device 41 and the exhaust valve operating device 42.

Figure 6:
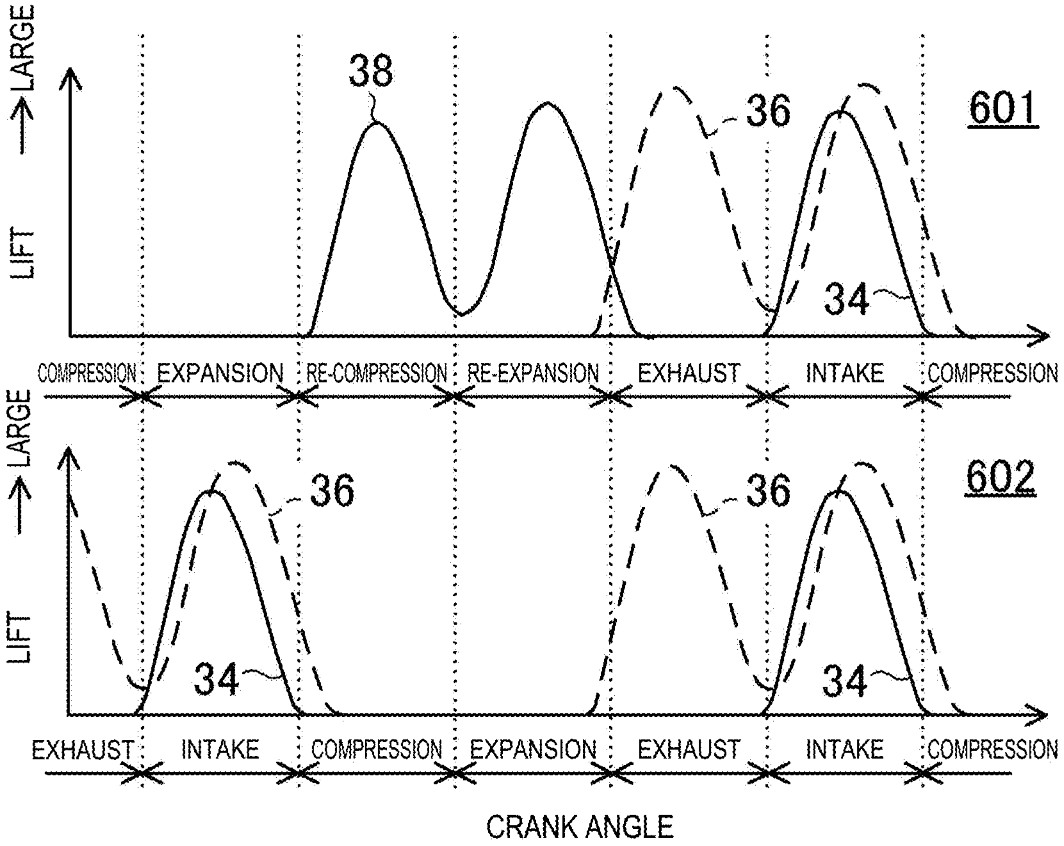
FIG. 6 shows lift curves of an intake valve, an exhaust valve, and an on-off valve.

FIG. 6 illustrates lift curves of the intake valve 34, the exhaust valve 36, and the on-off valve 38. The lateral axis of FIG. 6 represents a crank angle and the longitudinal axis represents a valve lift. A chart 601 is an example of the lift curves of the intake valve 34, the exhaust valve 36, and the on-off valve 38 when the six-stroke cycle is performed.

In the chart 601, the on-off valve 38 opens in the re-compression stroke and opens in the re-expansion stroke. In the re-compression stroke, a combustion gas inside the cylinder 31 is introduced into the third port 37 and in the re-expansion stroke, the combustion gas flows into the cylinder 31 through the third port 37.

The chart 601 shows the lift curves when the required load is relatively low. In the exhaust stroke subsequent to the re-expansion stroke, the exhaust valve 36 opens. An exhaust gas inside the cylinder 31 is discharged to the exhaust port 35. Then, in the intake stroke subsequent to the exhaust stroke, the exhaust valve 36 reopens. Part of the exhaust gas inside the exhaust port 35 is re-introduced into the cylinder 31 as the EGR gas. When the load of the reciprocating engine 3 is relatively low, the valve lift of the exhaust valve 36 that opens in the intake stroke is at the maximum, for example. Further, in the intake stroke, the intake valve 34 also opens. In the chart 601, the valve lift of the intake valve 34 is at the maximum. Fresh air introduced into the cylinder 31 is relatively large in amount and the EGR gas is relatively small in amount.

Here, during the six-stroke cycle being performed by the reciprocating engine 3, there are two more strokes per cycle as compared to the time when the four-stroke cycle is performed. The output of the reciprocating engine 3 during the six-stroke cycle being performed is two-thirds of the output during the four-stroke cycle being performed. When the required load of the reciprocating engine 3 increases, it is difficult for the reciprocating engine 3 during the six-stroke cycle being performed to satisfy the required load.

Thus, in the control system 2 for a vehicle, when the reciprocating engine 3 is performing the six-stroke cycle and the required load of the reciprocating engine 3 is equal to or greater than a load Pe2, the electric motor 27 is operated (see FIG. 5). The electric motor 27 functions as an assist motor to complement an output shortage of the reciprocating engine 3. The drive power required for traveling the vehicle is output by the reciprocating engine 3 and the electric motor 27 cooperating with each other.

Note that the load Pe2 may be a load included in a high load region when the operating region of the reciprocating engine 3 is trisected into the low load region, the medium load region, and the high load region in the load direction.

When the required load is low, the amount of the combustion gas introduced into the decomposer 6 is reduced. Even when the rotational speed of the reciprocating engine 3 is high to thus reduce the reaction available time, if the decomposition capability of the decomposer 6 is high, the decomposer 6 can decompose the hydrocarbon fuel. Thus, in the control map 101 of FIG. 5, the first region 102 where the six-stroke cycle is performed is expanded to the region of a high speed and a low load. The expansion of the first region 102 reduces the region where the hydrocarbon fuel is combusted, and is thus advantageous in terms of carbon neutrality. Note that the first region 102 may only be a region of the rotational speed lower than the first rotational speed N1.

The controller 21 also causes the reciprocating engine 3 to perform the four-stroke cycle in the second region 103. Specifically, the controller 21 stops opening the on-off valve 38 via the third valve operating device 43 while opening the intake valve 34 and the exhaust valve 36 at predetermined timing via the intake valve operating device 41 and the exhaust valve operating device 42. A chart 602 of FIG. 6 shows the lift curves of the intake valve 34 and the exhaust valve 36 when the four-stroke cycle is performed. When the four-stroke cycle is performed, the re-compression stroke and the re-expansion stroke are omitted, and therefore, the pumping loss of the reciprocating engine 3 is reduced. Although the reciprocating engine 3 is operated using the hydrocarbon fuel, the fuel consumption can be suppressed. Note that the reciprocating engine 3 includes a mechanism for changing the speed ratio between the crankshaft and the camshaft in switching between the six-stroke cycle and the four-stroke cycle.

Figure 7:
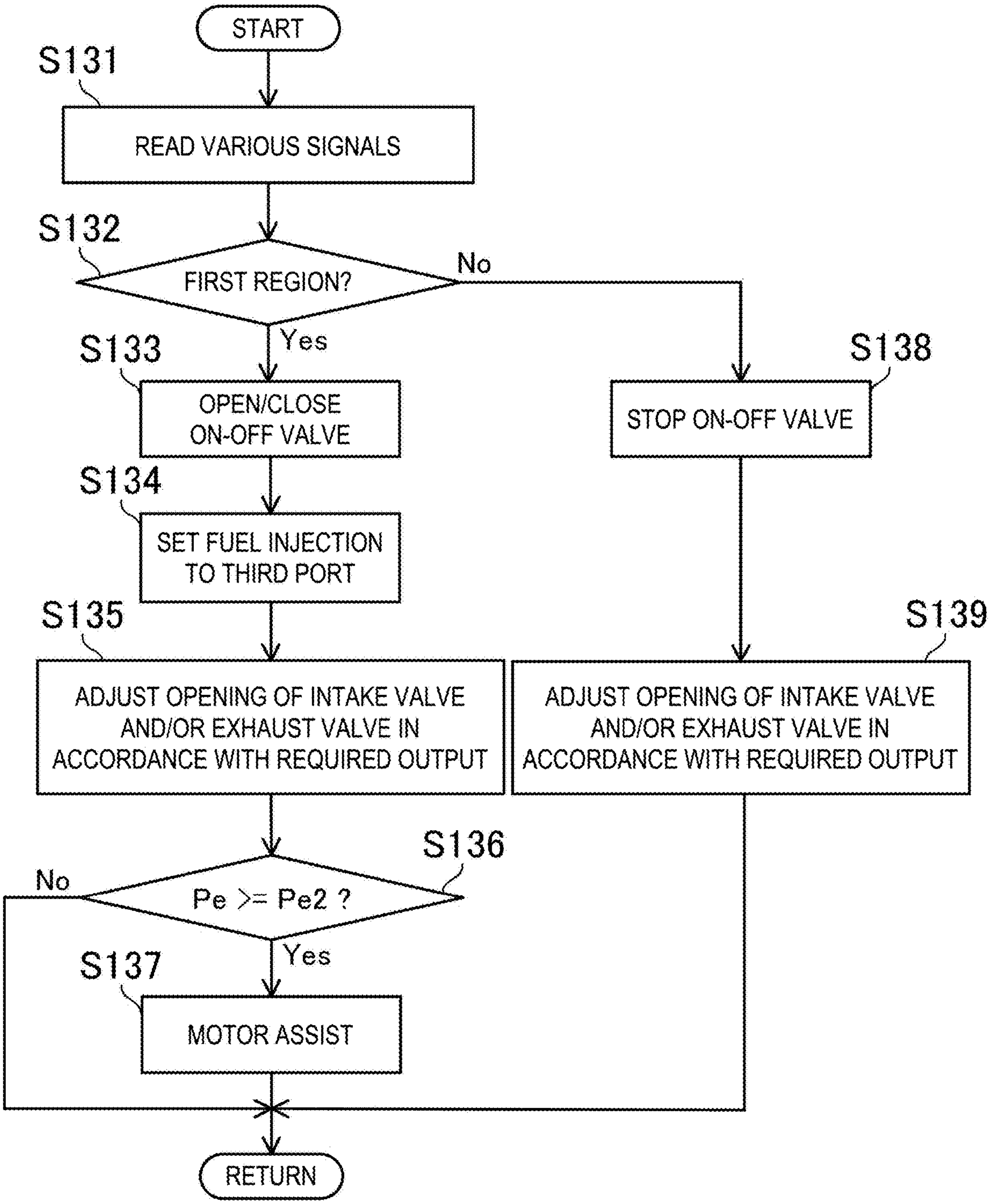
FIG. 7 shows a flowchart of engine control.

A flowchart of FIG. 7 shows control procedures on switching between the six-stroke cycle and the four-stroke cycle. In step S131 after the start, the controller 21 reads various signals, and in the subsequent step S132, the controller 21 determines, based on the read signal and the control map 101, whether the operating conditions of the reciprocating engine 3 are in the first region 102. When the determination in step S132 is Yes, that is, when the operating conditions of the reciprocating engine 3 are in the first region 102, the controller 21 opens and closes the on-off valve 38 of the third port 37 in step S133. Further, in step S134, the controller 21 causes the third port injector 46 to inject the hydrocarbon fuel to the third port 37. The reciprocating engine 3 performs the six-stroke cycle.

In step S135, the controller 21 adjusts the opening of the intake valve 34 and/or the exhaust valve 36 in accordance with the required output. In step S136, the controller 21 determines whether the required load Pe is equal to or greater than the load Pe2. When the determination in step S136 is Yes, the controller 21 operates the electric motor 27 to cause the electric motor 27 to assist the reciprocating engine 3 in step S137. When the determination in step S136 is No, the controller 21 does not operate the electric motor 27.

Returning to step S132, when the determination in step S132 is No, the controller 21 stops the on-off valve 38 in step S138. The reciprocating engine 3 performs the four-stroke cycle.

In step S139, the controller 21 adjusts the opening of the intake valve 34 and/or the exhaust valve 36 in accordance with the required output.

(Fuel Injection Timing)

The fuel reforming system 1 decomposes a hydrocarbon fuel using the piston strokes of the reciprocating engine 3. In this case, it is required to secure the reaction available time of the hydrocarbon fuel sufficiently long. This is because if the reaction available time cannot be secured long, the yields of carbon and a hydrogen gas in the fuel reforming system 1 are reduced.

The fuel reforming system 1 is characterized in the timing at which the third port injector 46 injects the fuel.

Figure 8:
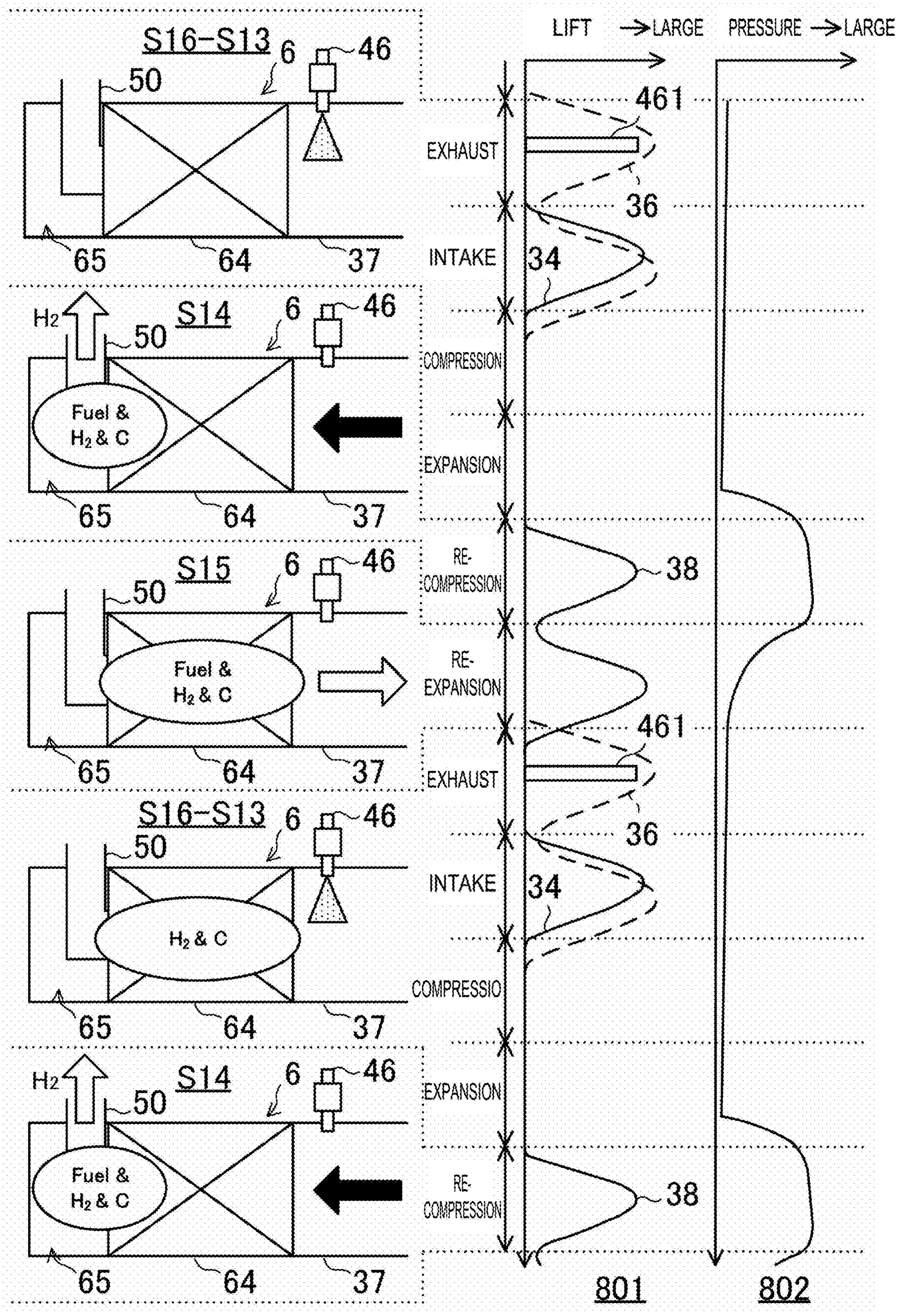
FIG. 8 shows injection timing of a hydrocarbon fuel.

FIG. 8 shows fuel injection timing of the third port injector 46. A chart 801 of FIG. 8 shows the valve lifts of the intake valve 34, the exhaust valve 36, and the on-off valve 38, and the fuel injection timing of the third port injector 46. In the chart 801 of FIG. 8, the fuel injection timing of the third port injector 46 is denoted by a reference sign 461. Further, a chart 802 of FIG. 8 shows changes in pressure of the third port 37 and the decomposer 6.

The third port injector 46 injects the hydrocarbon fuel to the third port 37 during a period in which the on-off valve 38 is closed. More specifically, as shown in S16-S13 of FIG. 8, the third port injector 46 injects the hydrocarbon fuel to the third port 37 between the decomposer 6 and the on-off valve 38 during the exhaust stroke. In other words, the third port injector 46 injects the fuel to the upstream side of the decomposer 6 relative to the flow of the fuel gas flowing from the cylinder 31 to the decomposer 6. The injected hydrocarbon fuel vaporizes while the on-off valve 38 is closed, specifically, while the reciprocating engine 3 undergoes the exhaust stroke, the intake stroke, the compression stroke, and the expansion stroke.

Here, the third port injector 46 is an injector having a high injection pressure so as to enable all the hydrocarbon fuel in a required amount to be injected during the period in which the on-off valve 38 is closed. For the third port injector 46, a gasoline direct injector may be used. The gasoline direct injector is also advantageous in vaporization of the hydrocarbon fuel since the injected fuel is finely granulated.

At the timing of the third port injector 46 injecting the hydrocarbon fuel, the gas flow does not substantially exist in the third port 37. This is because the on-off valve 38 is closed. The third port injector 46 having a high injection pressure is advantageous in promoting the vaporization of the hydrocarbon fuel in injecting the hydrocarbon fuel to the third port 37 where the gas flow does not substantially exist.

Note that the third port injector 46 may inject the hydrocarbon fuel during the period in which the on-off valve 38 is closed, and when the third port injector 46 injects the fuel at timing that is the most apart from the timing of opening the on-off valve 38, the longest vaporization time of the hydrocarbon fuel can be secured. The third port injector 46 may inject the hydrocarbon fuel immediately after the on-off valve 38 is closed. The timing immediately after the on-off valve 38 is closed corresponds to the aforementioned exhaust stroke.

The on-off valve 38 opens in the re-compression stroke as described above. As denoted by a black arrow in S14, the combustion gas flows from the cylinder 31 to the decomposer 6. The combustion gas carries the hydrocarbon fuel inside the third port 37 toward the decomposer 6. At least part of the hydrocarbon fuel is decomposed into carbon and a hydrogen gas by the catalytic reaction in the decomposer 6. The carbon is stored in the decomposer 6 and the hydrogen gas passes through the hydrogen gas passage 50 to be delivered to the hydrogen gas supply unit 5. When the piston 32 reaches the top dead center in the re-compression stroke, the combustion gas containing the hydrocarbon fuel and part of the carbon and the hydrogen gas flow into the space 65 by passing through the catalyst portion 64 of the decomposer 6.

In the re-expansion stroke subsequent to the re-compression stroke, the on-off valve 38 opens and the piston 32 descends. In accordance with descending of the piston 32, the gas inside the third port 37 flows from the decomposer 6 toward the cylinder 31 (see a white arrow in S15). The combustion gas containing the hydrocarbon fuel and part of the carbon and the hydrogen gas inside the space 65 flow toward the catalyst portion 64 along with the gas flow and remain there.

Once the on-off valve 38 closes in the exhaust stroke after the re-expansion stroke, the on-off valve 38 remains closed during the period of the subsequent exhaust stroke, intake stroke, compression stroke, and expansion stroke (see S16-S13). Since the hydrocarbon fuel remains in the catalyst portion 64, the decomposition time of the hydrocarbon fuel can be secured sufficiently long in the period until the on-off valve 38 opens in the re-compression stroke S14.

The third port injector 46 injects the hydrocarbon fuel during the stroke in which the on-off valve 38 is closed, so that the vaporization time of the hydrocarbon fuel can be secured long and the time of the hydrocarbon fuel remaining in the catalyst portion 64 of the decomposer 6 can be secured long, thereby increasing the yields of the carbon and the hydrogen gas in the fuel reforming system 1.

Note that as described above, during the exhaust stroke in S16-S13, the third port injector 46 injects the hydrocarbon fuel so that the vaporization is promoted. In the subsequent re-compression stroke in S14, the vaporized hydrocarbon fuel is transported to the catalyst portion 64 by means of the combustion gas.

(Modification of Timing of Fuel Injection to Third Port)

Figure 9:
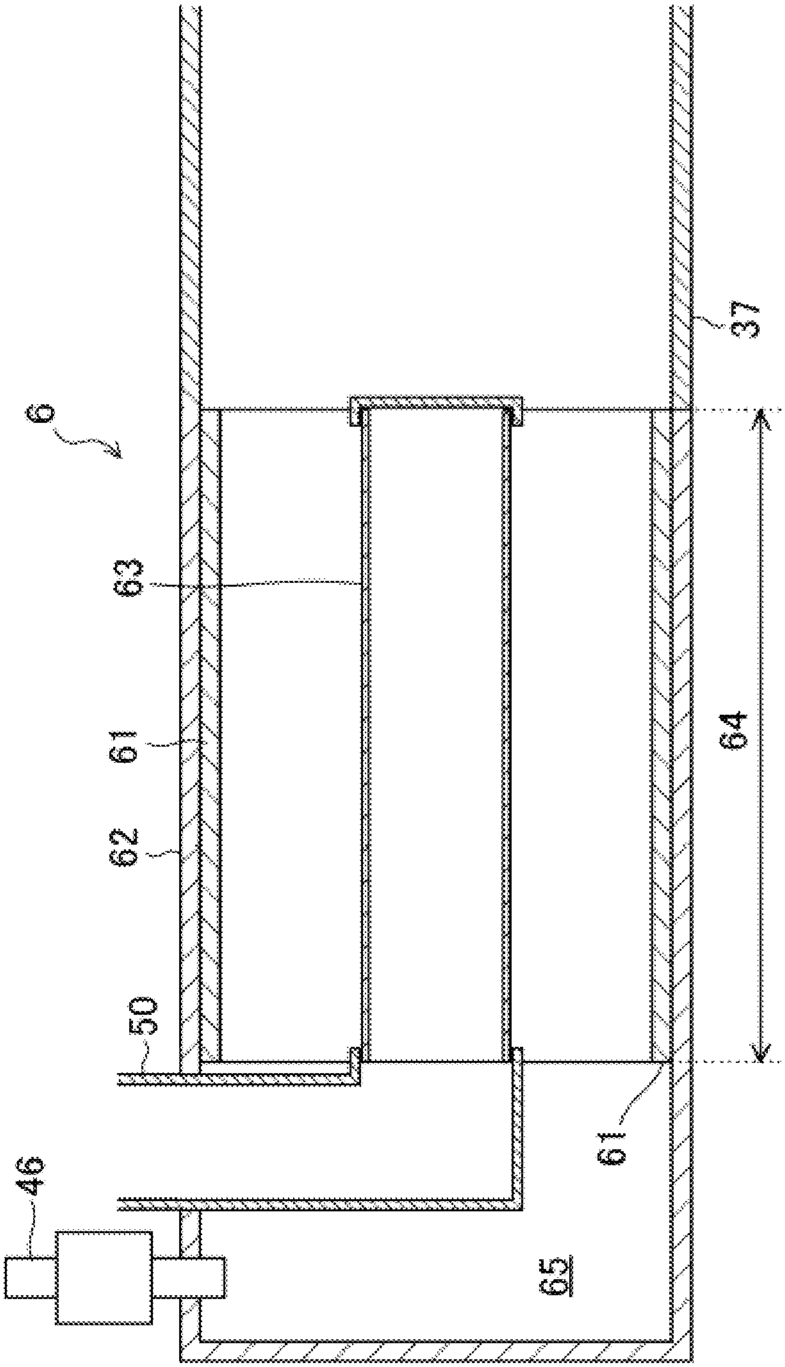
FIG. 9 shows the decomposer according to a modification.

FIG. 9 shows a modification of the third port injector 46. In the modification, the third port injector 46 is positioned in the space 65 of the decomposer 6 and injects the hydrocarbon fuel into the space 65. In other words, the third port injector 46 is positioned on a downstream side of the catalyst portion 64 of the decomposer 6 relative to the flow direction of the combustion gas flowing from the cylinder 31 to the decomposer 6.

Figure 10:
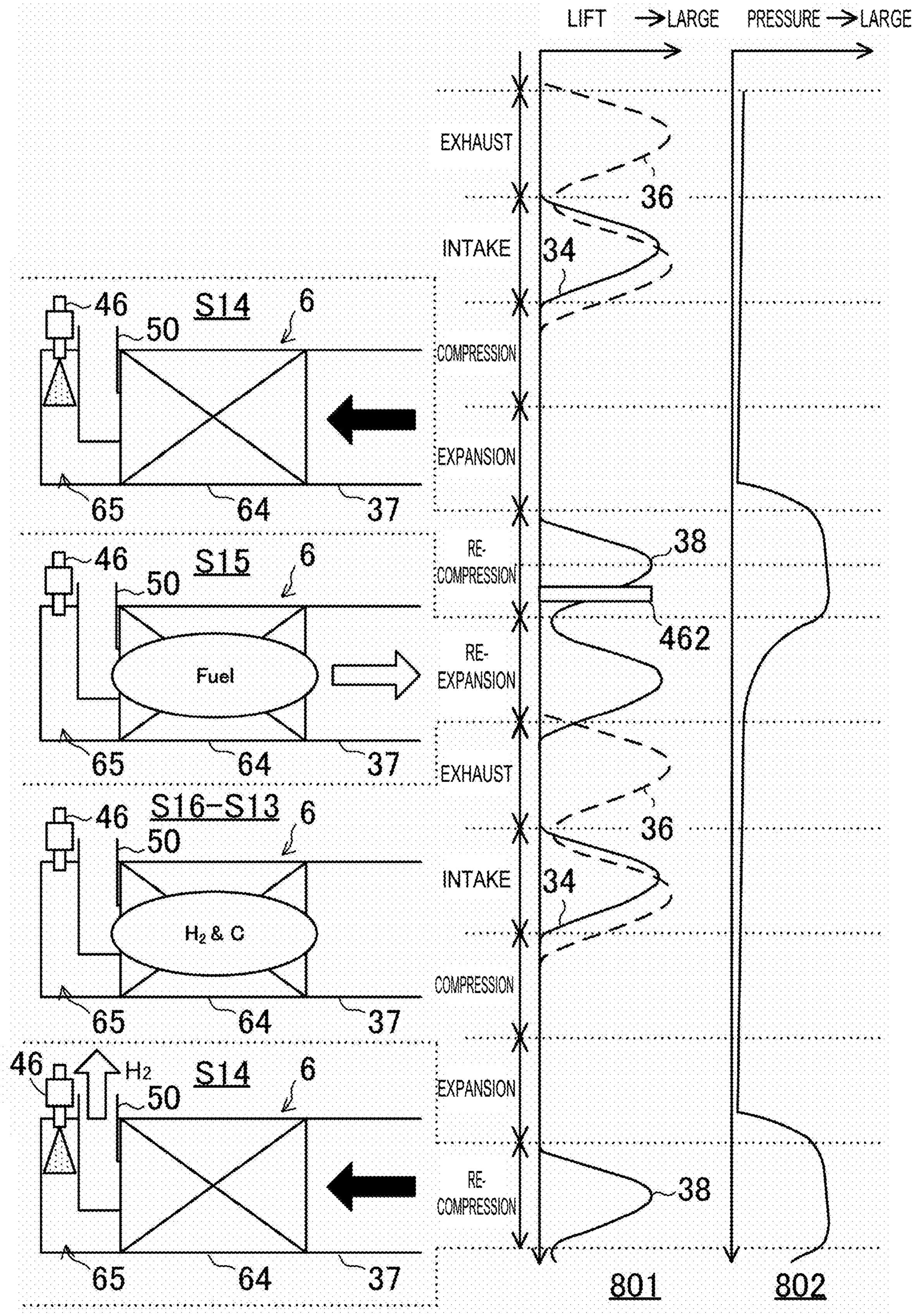
FIG. 10 shows injection timing of a hydrocarbon fuel according to the modification.

FIG. 10 shows fuel injection timing of the third port injector 46 that injects the hydrocarbon fuel into the space 65. A chart 801 of FIG. 10 shows the valve lifts of the intake valve 34, the exhaust valve 36, and the on-off valve 38, and the fuel injection timing of the third port injector 46. In the chart 801 of FIG. 10, the fuel injection timing of the third port injector 46 is denoted by a reference sign 462. Further, a chart 802 of FIG. 10 shows changes in pressure of the third port 37 and the decomposer 6.

The third port injector 46 injects the hydrocarbon fuel to the space 65 during a period in which the on-off valve 38 is opened and the piston 32 is ascending. More specifically, as shown in S14 of FIG. 10, the third port injector 46 injects the hydrocarbon fuel into the space 65 of the decomposer 6 during the re-compression stroke.

Here, the third port injector 46 may inject the hydrocarbon fuel into the space 65 in a latter part of the re-compression stroke. The latter part of the re-compression stroke may be the latter half when the re-compression stroke is bisected into the former half and the latter half. The reason is that since in the latter part of the re-compression stroke, the pressure inside the third port 37 and the decomposer 6 is high and the temperature inside the third port 37 and the decomposer 6 is also high, there is an advantage in the vaporization of the injected hydrocarbon fuel. Further, as will be described later, injecting the hydrocarbon fuel into the space 65 in the latter part of the re-compression stroke has an advantage also in maintaining the hydrocarbon fuel in the catalyst portion 64 utilizing the gas flow in the re-expansion stroke.

In the re-expansion stroke subsequent to the re-compression stroke, the injected hydrocarbon fuel reaches the catalyst portion 64 of the decomposer 6 from the space 65 along with the flow of gas flowing from the decomposer 6 toward the cylinder 31, and remains there (see S15). Thereafter, during the period in which the on-off valve 38 is closed, specifically, during the exhaust stroke, the intake stroke, the compression stroke, and the expansion stroke, the hydrocarbon fuel vaporizes and is decomposed into carbon and a hydrogen gas by means of the catalyst (see S16-S13). The carbon adheres to the surface of the catalyst carrier 61.

Thereafter, the on-off valve 38 opens in the re-compression stroke (see S14). As denoted by a black arrow, the combustion gas flows from the cylinder 31 toward the decomposer 6. Because of the gas flow inside the third port 37, the hydrogen gas passes through the separation membrane 63 to reach the hydrogen gas passage 50 and is delivered to the hydrogen gas supply unit 5 through the hydrogen gas passage 50.

Then, as described above, during the re-compression stroke, the third port injector 46 injects the hydrocarbon fuel into the space 65.

The third port injector 46 injects the hydrocarbon fuel during the stroke in which the on-off valve 38 is opened and the piston 32 is ascending, so that the vaporization time of the hydrocarbon fuel can be secured long and the time of the hydrocarbon fuel remaining in the catalyst portion 64 of the decomposer 6 can be secured long, thereby increasing the yields of the carbon and the hydrogen gas in the fuel reforming system 1.

(Irregular Four-Stroke Cycle)

Figure 11:
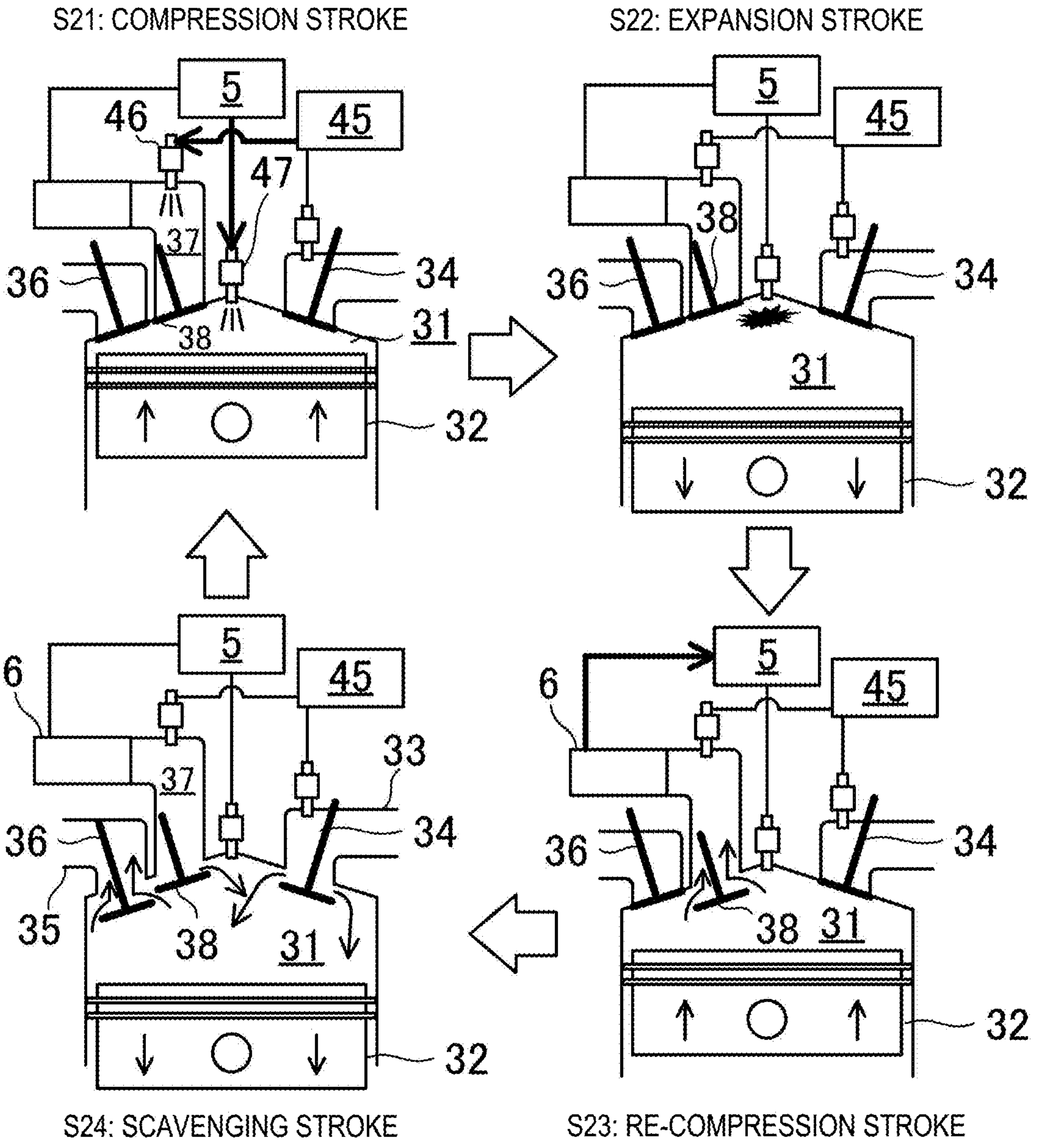
FIG. 11 shows each stroke of an irregular four-stroke cycle.

The reciprocating engine 3 may perform an irregular four-stroke cycle in place of the six-stroke cycle. FIG. 11 shows each stroke included in the irregular four-stroke cycle. Note that in FIG. 11, the third port injector 46 injects the hydrocarbon fuel between the decomposer 6 and the on-off valve 38.

S21 is the compression stroke. In the compression stroke S21, the reciprocating engine 3 compresses an air-fuel mixture inside the cylinder 31 with ascending of the piston 32. The intake valve 34, the exhaust valve 36, and the on-off valve 38 are all closed.

The hydrogen injector 47 injects the hydrogen gas into the cylinder 31 during the compression stroke S21. Note that when the hydrogen gas is in short supply, in a scavenging stroke S24 described later, the intake port injector 44 may inject the hydrocarbon fuel to the intake port 33 so as to complement the shortage. Further, when there is no hydrogen gas, the intake port injector 44, in place of the hydrogen injector 47, may inject the hydrocarbon fuel to the intake port 33 in the scavenging stroke S24. When the hydrogen gas to be supplied into the cylinder 31 is in short supply, the intake port injector 44 injects the hydrocarbon fuel so that a required fuel amount of the reciprocating engine 3 is secured. The reciprocating engine 3 can operate using the hydrocarbon fuel or both the hydrocarbon fuel and the hydrogen gas.

Further, in the compression stroke S21, the third port injector 46 injects the hydrocarbon fuel into the third port 37. As described above, the vaporization time of the hydrocarbon fuel is secured long.

The spark plug 26 ignites an air-fuel mixture inside the cylinder 31 at timing near a compression top dead center. The air-fuel mixture starts combustion. S22 is the expansion stroke. In the expansion stroke S22, the piston 32 descends with the combustion of the air-fuel mixture. The intake valve 34, the exhaust valve 36, and the on-off valve 38 are all closed.

S23 is the re-compression stroke. In the re-compression stroke S23, the reciprocating engine 3 compresses a combustion gas inside the cylinder 31 with ascending of the piston 32. In the re-compression stroke S23, the on-off valve 38 opens. The compressed combustion gas is introduced into the decomposer 6 through the third port 37. The hydrocarbon fuel injected into the third port 37 in the compression stroke S21 is introduced into the decomposer 6 together with the combustion gas. As described above, in the decomposer 6, the hydrocarbon fuel is decomposed into carbon and a hydrogen gas by means of the heat of the combustion gas and the catalyst. The carbon is stored in the decomposer 6. The hydrogen gas permeates through the separation membrane 63 of the decomposer 6 to be delivered to the hydrogen gas supply unit 5 by means of the pressure of the combustion gas.

S24 is the scavenging stroke. In the scavenging stroke S24, the piston 32 descends. In the scavenging stroke S24, the on-off valve 38 opens. When the on-off valve 38 opens, the combustion gas with the carbon and the hydrogen gas removed is introduced into the cylinder 31 through the third port 37.

In the scavenging stroke S24, the exhaust valve 36 opens. The combustion gas inside the cylinder 31 is discharged to the exhaust port 35. In the scavenging stroke S24, the intake valve 34 also opens. Intake air is introduced into the cylinder 31 through the intake port 33. The intake air contains at least fresh air. The intake air may contain an EGR gas. The EGR gas is a so-called external EGR gas, which is circulated into the intake pipe through an EGR passage. In the scavenging stroke S24, the reciprocating engine 3 performs gas exchange inside the cylinder 31.

After the scavenging stroke S24, the reciprocating engine 3 returns to the compression stroke S21.

In this manner, the fuel reforming system 1 including the reciprocating engine 3 that performs the irregular four-stroke cycle can store, in the decomposer 6, the carbon produced by decomposition of the hydrocarbon fuel. Further, since the reciprocating engine 3 combusts the hydrogen gas produced by the decomposition of the hydrocarbon fuel, an oxide of carbon resulted from the combustion is not generated. The fuel reforming system 1 can realize carbon neutrality.

Further, the third port injector 46 injects the hydrocarbon fuel into the third port 37 in the compression stroke S21 in the period in which the on-off valve 38 is closed, so that the vaporization time of the hydrocarbon fuel can be secured long and the decomposition time of the hydrocarbon fuel can also be secured long.

Figure 12:
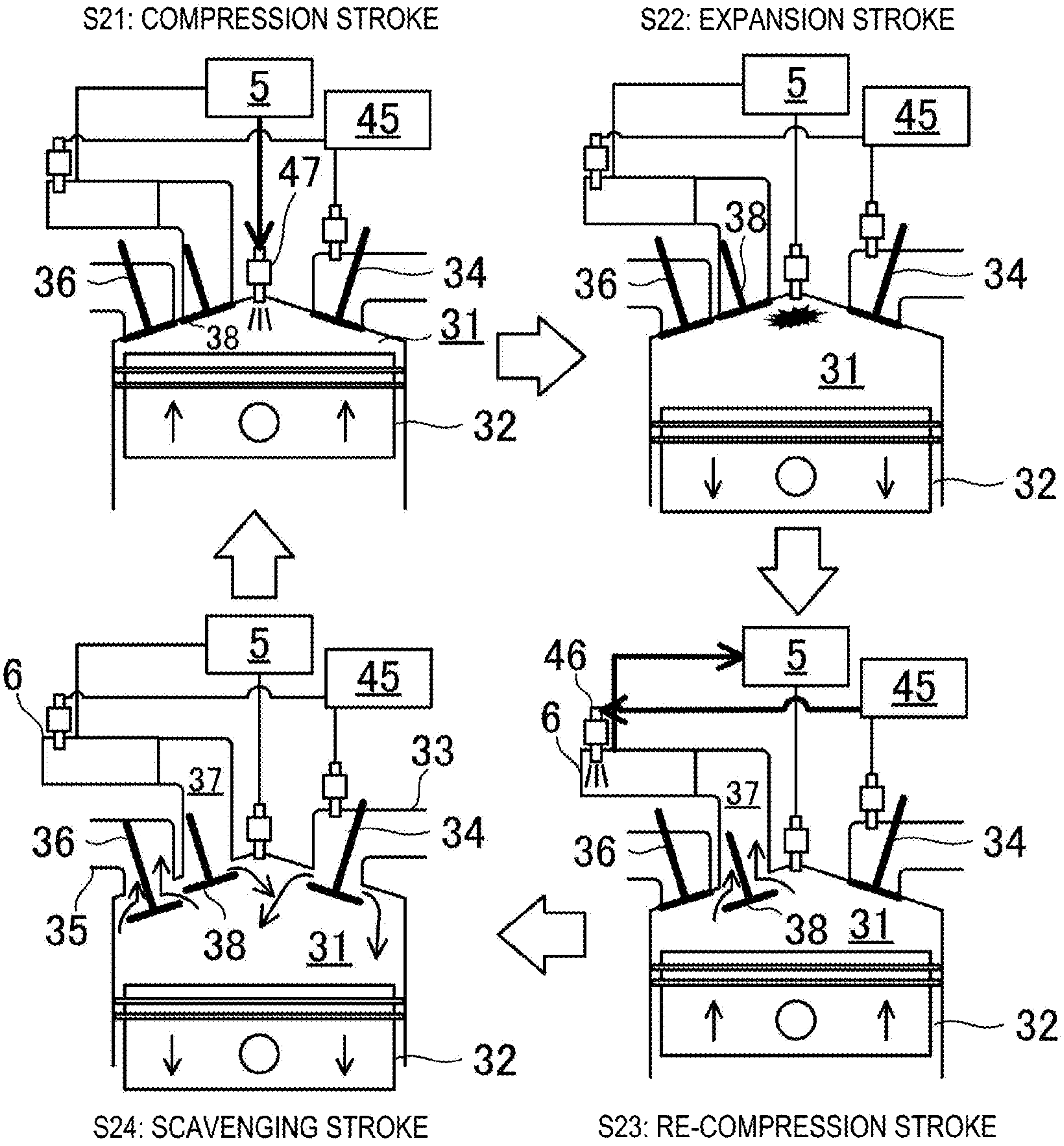
FIG. 12 shows each stroke of the irregular four-stroke cycle according to a modification.

FIG. 12 shows a modification of the third port injector 46 in the reciprocating engine 3 that performs the irregular four-stroke cycle. The third port injector 46 injects the hydrocarbon fuel into the space 65 of the decomposer 6.

The third port injector 46 injects the hydrocarbon fuel into the space 65 in the re-compression stroke S23 which is the timing at which the on-off valve 38 is opened and in which the piston 32 is ascending. As described above, in the subsequent scavenging stroke S24, the hydrocarbon fuel injected into the space 65 reaches the catalyst portion 64 because of the gas flow from the decomposer 6 to the cylinder 31. Thereafter, the hydrocarbon fuel is decomposed into carbon and a hydrogen gas, between the compression stroke S21 and the expansion stroke S22. The third port injector 46 injects the hydrocarbon fuel to the downstream side of the catalyst portion 64 in the re-compression stroke S23 which is the period of the on-off valve 38 being opened and in which the piston 32 is ascending, so that the vaporization time of the hydrocarbon fuel can be secured long and the decomposition time of the hydrocarbon fuel can also be secured long.

Note that the technique disclosed herein is not limited to the aforementioned configurations. For example, the reciprocating engine 3 may be a compression-ignition engine.

Further, the decomposer 6 of the fuel reforming system 1 is not limited to the membrane reactor. As long as the hydrocarbon fuel can be decomposed utilizing the heat and the pressure of the combustion gas, the decomposer 6 may be in any structure.

REFERENCE SIGNS LIST

1 fuel reforming system
3 reciprocating engine
31 cylinder
32 piston
33 intake port
35 exhaust port
37 third port
38 on-off valve
6 decomposer
64 catalyst portion
65 space
S11 intake stroke
S12 compression stroke
S13 expansion stroke
S14 re-compression stroke
S15 re-expansion stroke
S16 exhaust stroke
S21 compression stroke
S22 expansion stroke
S23 re-compression stroke
S24 scavenging stroke

The invention claimed is:

1. A fuel reforming system for a vehicle, the fuel reforming system comprising:
- a reciprocating engine mounted on the vehicle and in which a piston in a cylinder reciprocates;
- a decomposer that decomposes a hydrocarbon fuel into carbon and a hydrogen gas; and
- a hydrocarbon fuel supply device that supplies the hydrocarbon fuel to the decomposer, wherein
- the reciprocating engine includes an intake port, an exhaust port, and a third port that allows the cylinder and the decomposer to communicate and that is opened and closed by an on-off valve,
- the on-off valve opens in a stroke in which a combustion gas inside the cylinder is supplied to the decomposer with ascending of the piston,
- the on-off valve opens in a stroke in which a combustion gas, in which the carbon and the hydrogen gas has been removed, is introduced from the third port to the cylinder with descending of the piston, and
- the hydrocarbon fuel supply device injects the hydrocarbon fuel into the third port between the on-off valve and the decomposer during a stroke in which the on-off valve is closed.

2. The fuel reforming system according to claim 1, wherein the hydrocarbon fuel supply device injects the hydrocarbon fuel into the third port immediately after closing the opened on-off valve.

3. The fuel reforming system according to claim 1, wherein
- the reciprocating engine performs a six-stroke cycle, the six-stroke cycle including:
  - an intake stroke in which at least intake air is introduced into the cylinder through the intake port with descending of the piston;
  - a compression stroke in which an air-fuel mixture containing the hydrogen gas supplied into the cylinder is compressed with ascending of the piston;
  - an expansion stroke in which the piston descends with combustion of the air-fuel mixture;
  - a re-compression stroke in which a combustion gas is compressed with ascending of the piston;
  - a re-expansion stroke in which the piston descends; and
  - an exhaust stroke in which an exhaust gas is discharged through the exhaust port with ascending of the piston,
- the on-off valve opens in the re-compression stroke and the re-expansion stroke, and
- the on-off valve closes in the intake stroke, the compression stroke, the expansion stroke, and the exhaust stroke.

4. The fuel reforming system according to claim 1, wherein
- the reciprocating engine performs an irregular four-stroke cycle, the irregular four-stroke cycle including:
  - a compression stroke in which an air-fuel mixture containing the hydrogen gas supplied into the cylinder is compressed with ascending of the piston;
  - an expansion stroke in which the piston descends with combustion of the air-fuel mixture;
  - a re-compression stroke in which a combustion gas is compressed with ascending of the piston; and
  - a scavenging stroke in which an exhaust gas inside the cylinder is discharged through the exhaust port and at least intake air is introduced into the cylinder through the intake port with descending of the piston, the on-off valve opens in the re-compression stroke and the scavenging stroke, and the on-off valve closes in the compression stroke and the expansion stroke.

5. A fuel reforming system for a vehicle, the fuel reforming system comprising:

a reciprocating engine mounted on the vehicle and in which a piston in a cylinder reciprocates;

a decomposer that decomposes a hydrocarbon fuel into carbon and a hydrogen gas; and a hydrocarbon fuel supply device that supplies the hydrocarbon fuel to the decomposer, wherein the reciprocating engine includes an intake port, an exhaust port, and a third port that allows the cylinder and the decomposer to communicate and that is opened and closed by an on-off valve, the on-off valve opens in a stroke in which a combustion gas inside the cylinder is supplied to the decomposer with ascending of the piston, the on-off valve opens in a stroke in which a combustion gas, in which the carbon and the hydrogen gas has been removed, is introduced from the third port to the cylinder with descending of the piston, the decomposer includes a catalyst portion that decomposes the hydrocarbon fuel using a catalyst and a space that is on a side opposite to the third port across the catalyst portion, the space being connected to the catalyst portion, and the hydrocarbon fuel supply device injects the hydrocarbon fuel into the space during a stroke in which the on-off valve is opened and the piston is ascending.

6. The fuel reforming system according to claim 5, wherein the hydrocarbon fuel supply device injects the hydrocarbon fuel into the space during a stroke in which the piston is ascending.

7. The fuel reforming system according to claim 5, wherein the reciprocating engine performs a six-stroke cycle, the six-stroke cycle including:

an intake stroke in which at least intake air is introduced into the cylinder through the intake port with descending of the piston;

a compression stroke in which an air-fuel mixture containing the hydrogen gas supplied into the cylinder is compressed with ascending of the piston;

an expansion stroke in which the piston descends with combustion of the air-fuel mixture;

a re-compression stroke in which a combustion gas is compressed with ascending of the piston;

a re-expansion stroke in which the piston descends; and an exhaust stroke in which an exhaust gas is discharged through the exhaust port with ascending of the piston, the on-off valve opens in the re-compression stroke and the re-expansion stroke, and the on-off valve closes in the intake stroke, the compression stroke, the expansion stroke, and the exhaust stroke.

8. The fuel reforming system according to claim 5, wherein the reciprocating engine performs an irregular four-stroke cycle, the irregular four-stroke cycle including:

a compression stroke in which an air-fuel mixture containing the hydrogen gas supplied into the cylinder is compressed with ascending of the piston;

an expansion stroke in which the piston descends with combustion of the air-fuel mixture;

a re-compression stroke in which a combustion gas is compressed with ascending of the piston; and a scavenging stroke in which an exhaust gas inside the cylinder is discharged through the exhaust port and at least intake air is introduced into the cylinder through the intake port with descending of the piston, the on-off valve opens in the re-compression stroke and the scavenging stroke, and the on-off valve closes in the compression stroke and the expansion stroke.

* * * * *